US010925295B2

(12) United States Patent
Chisholm et al.

(10) Patent No.: US 10,925,295 B2
(45) Date of Patent: Feb. 23, 2021

(54) AERATED CONFECTIONERY MATERIAL

(71) Applicant: NESTEC S.A., Vevey (CH)

(72) Inventors: Helen Chisholm, Cheseaux (CH); Zeynel Deniz Gunes, Lausanne (CH); Cecile Gehin-Delval, Les Hopitaux Neufs (FR); Corinne Appolonia Nouzille, Lausanne (CH); Emma Garvey, East Yorkshire (GB); Mathieu Julien Destribats, Belmont sur Lausanne (CH); Shantha Nalur Chandrasekaran, Leeds (GB); Joselio Batista Vieira, York (GB); Jamey German, York (GB); Bernard Paul Binks, East Yorkshire (GB)

(73) Assignee: Societe des Produits Nestle S.A., Vevey (CH)

( * ) Notice: Subject to any disclaimer, the term of this patent is extended or adjusted under 35 U.S.C. 154(b) by 231 days.

(21) Appl. No.: 15/559,994

(22) PCT Filed: Mar. 22, 2016

(86) PCT No.: PCT/EP2016/056280
§ 371 (c)(1),
(2) Date: Sep. 20, 2017

(87) PCT Pub. No.: WO2016/150977
PCT Pub. Date: Sep. 29, 2016

(65) Prior Publication Data
US 2018/0064127 A1 Mar. 8, 2018

(30) Foreign Application Priority Data
Mar. 23, 2015 (EP) .................... 15160354

(51) Int. Cl.
A23G 3/34 (2006.01)
A23G 1/30 (2006.01)
(Continued)

(52) U.S. Cl.
CPC ............... *A23G 1/305* (2013.01); *A23G 1/36* (2013.01); *A23G 1/52* (2013.01); *A23G 3/343* (2013.01);
(Continued)

(58) Field of Classification Search
CPC . A23G 1/305; A23G 1/36; A23G 1/52; A23G 3/343; A23G 3/40; A23G 3/52; A23G 9/322; A23G 2220/02
See application file for complete search history.

(56) References Cited

U.S. PATENT DOCUMENTS 3,549,387 A 12/1970 Howard
6,737,100 B1 * 5/2004 Matsui ..................... A23D 9/00
426/572

(Continued)

FOREIGN PATENT DOCUMENTS

EP 1166639 1/2002
WO 2010121491 10/2010
WO 2012041630 4/2012

Primary Examiner — Cephia D Toomer
(74) Attorney, Agent, or Firm — K&L Gates LLP

(57) ABSTRACT

The present invention relates generally to the field of aerated fat-based confectionery material. One aspect of the invention provides an aerated fat-based confectionery material having a continuous lipid phase and a porosity of between 1 and 80%, wherein, at a temperature at which the lipid phase has a solid lipid content between 0.1 and 80, the fat-based confectionery material comprises gas bubbles having at least 50% of their surface occupied by crystals, the crystals comprising a glyceride selected from the group consisting of monoglycerides, diglycerides, triglycerides, esters of monoglycerides, esters of diglycerides and combinations of these.

(Continued)

Further aspects of the invention are a confectionery product comprising an aerated fat-based confectionery material and a process for forming an aerated fat-based confectionery material.

13 Claims, 14 Drawing Sheets

(51) Int. Cl.
*A23G 1/36* (2006.01)
*A23G 1/52* (2006.01)
*A23G 3/40* (2006.01)
*A23G 3/52* (2006.01)
*A23G 9/32* (2006.01)

(52) U.S. Cl.
CPC ................. *A23G 3/40* (2013.01); *A23G 3/52* (2013.01); *A23G 9/322* (2013.01); *A23G 2220/02* (2013.01)

(56) References Cited

U.S. PATENT DOCUMENTS

| | | |
|---|---|---|
| 2008/0241333 A1 | 10/2008 | Cina et al. |
| 2012/0052180 A1 | 3/2012 | Esteve et al. |

\* cited by examiner

Fig 19
Fig. 20
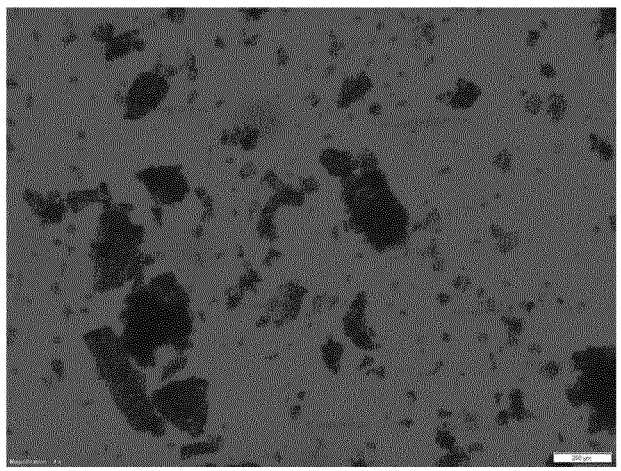
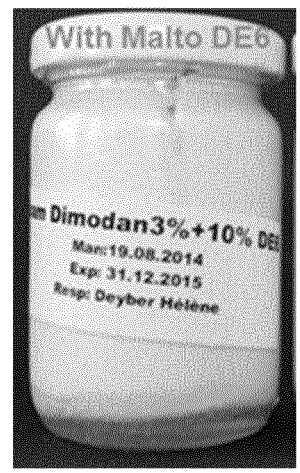
Fig. 21
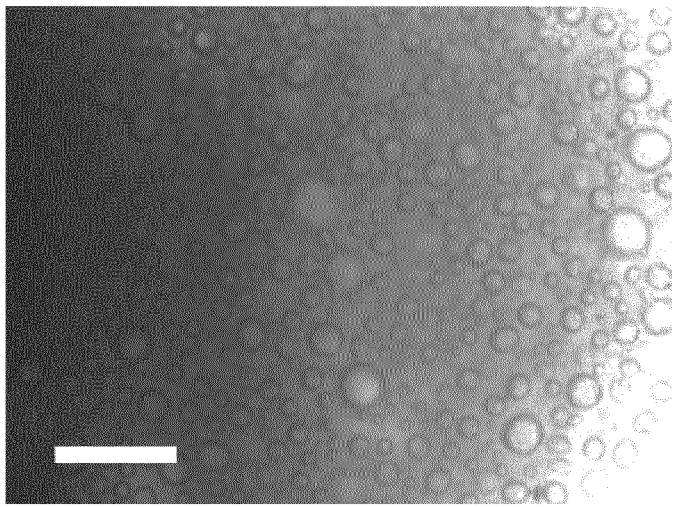

AERATED CONFECTIONERY MATERIAL

CROSS REFERENCE TO RELATED APPLICATIONS

The present application is a National Stage of International Application No. PCT/EP2016/056280, filed on Mar. 22, 2016, which claims priority to European Patent Application No. 15160354.5, filed on Mar. 23, 2015, the entire contents of which are being incorporated herein by reference.

FIELD OF THE INVENTION

The present invention relates generally to the field of aerated fat-based confectionery material. One aspect of the invention provides an aerated fat-based confectionery material having a continuous lipid phase and a porosity of between 1 and 80%, wherein, at a temperature at which the lipid phase has a solid lipid content between 0.1 and 80%, the fat-based confectionery material comprises gas bubbles having at least 50% of their surface occupied by crystals, the crystals comprising a glyceride selected from the group consisting of monoglycerides, diglycerides, triglycerides, esters of monoglycerides, esters of diglycerides and combinations of these. Further aspects of the invention are a confectionery product comprising an aerated fat-based confectionery material and a process for forming an aerated fat-based confectionery material.

BACKGROUND OF THE INVENTION

Aerated fat-based confectionery material has been used in confectionery products for many years. Aeration provides appealing textures and appearance and may positively influence taste. Processes for aerating fat-based materials such as chocolate were patented as long ago as 1935 (GB459583). More recently aerated fat-based confectionery material has been used to coat ice confections such as ice cream (EP2566345), providing better thermal insulating properties than un-aerated material and superior sensory properties. Aerating fat-based confectionery material also satisfies consumer demand for lower fat products as less weight of material needs to be used to create the same volume.

The major difficulty in generating stable aerated structures within fat-based materials as compared to water-based systems lies in the lack of suitable surfactants for forming stable interfaces between air and lipid. Those surfactants which have been proposed may not be suitable for stabilizing edible aerated materials due to toxicity or unpleasant taste. As a consequence, the most common approach for obtaining stable foams in a fat-based matrix is by forming a rigid network in the bulk material, for example by forming a rigid network of crystals in a liquid fat continuous phase or by rapidly cooling the fat so as to solidify the bulk material. As well as affecting the texture in a way which may not always be desired, both of these approaches lead to constraints when processing the aerated material in the fluid state. Having a rigid network in the liquid fat-continuous phase affects the ability of the aerated material to be pumped, deposited, or mixed with other components without destroying the stabilizing network and leading to coalescence of bubbles. An aerated fat-based material stabilized by solidifying the bulk is generally unstable before solidification and so can only be maintained as a flowable foam for a short period and cannot be subject to substantial shear forces during processing.

Hence, there is a need in the industry to find better solutions to produce stable aerated fat-based confectionery material, in particular edible aerated fat-based confectionery materials which taste good and are made from natural ingredients. An object of the present invention is to improve the state of the art and to provide an improved solution to overcome at least some of the inconveniences described above or at least to provide a useful alternative. Any reference to prior art documents in this specification is not to be considered an admission that such prior art is widely known or forms part of the common general knowledge in the field. As used in this specification, the words "comprises", "comprising", and similar words, are not to be interpreted in an exclusive or exhaustive sense. In other words, they are intended to mean "including, but not limited to". The object of the present invention is achieved by the subject matter of the independent claims. The dependent claims further develop the idea of the present invention.

SUMMARY OF THE INVENTION

Accordingly, the present invention provides in a first aspect an aerated fat-based confectionery material having a continuous lipid phase and a porosity of between 1 and 80%, wherein, at a temperature at which the lipid phase has a solid lipid content between 0.1 and 80%, the fat-based confectionery material comprises gas bubbles having at least 50% of their surface occupied by crystals, the crystals comprising a glyceride selected from the group consisting of monoglycerides, diglycerides, triglycerides, esters of monoglycerides, esters of diglycerides and combinations of these. In a second aspect, the invention relates to a confectionery product comprising the aerated fat-based confectionery material of the invention. A third aspect of the invention relates to a process for forming an aerated fat-based confectionery material, the process comprising the steps of providing a composition having a lipid content greater than 20 wt. %; controlling the temperature of the composition such that the composition comprises glyceride crystals, has a solid lipid content between 0.1 and 80% and forms a gel; and aerating the gel.

It has been surprisingly found by the inventors that, by cooling a liquid lipid composition to a temperature at which there is partial crystallization and a gel is formed and then whipping the composition, a stable foam is produced. This stable foam may advantageously be used as an aerated fat-based confectionery material. The gas bubbles in the foam were found to be coated in lipid crystals. By using a process of prolonged and intensive whipping, very stable assemblies of crystal-wrapped bubbles can be obtained. The crystals jam together around the bubble, leading to mechanical stability and resisting bubble shrinkage. The bulk remains soft, e.g. there is no rigid network of crystals in between the bubbles. The foam can be diluted with oil (liquid lipid) and still remain stable (unless so much oil is added that it dissolves the crystals). The foam may be further cooled such that the continuous phase solidifies, but if the foam is re-heated and the continuous phase re-melts, the stable crystal-wrapped bubbles remain until the temperature is raised to the point where all crystals melt (or substantially all the crystals melt). The aerated fat-based confectionery material according to the invention when in a fluid state does not easily destabilize under mechanical processing, unlike aerated fat-based confectionery materials which rely on solidifying the bulk material to become stable.

BRIEF DESCRIPTION OF THE DRAWINGS

FIG. 19 shows a micrograph of a dispersion of maltodextrin particles in oil.

FIG. 20 shows a foam older than 4 days, made from a gel of 3% monoglyceride in high oleic sunflower oil in the presence of maltodextrin particles.

FIG. 21 is an optical micrograph of an aerated coating, 50/50 wt. % foam/pre-mix. Scale bar is 200 microns.

DETAILED DESCRIPTION OF THE INVENTION

Figure 1:
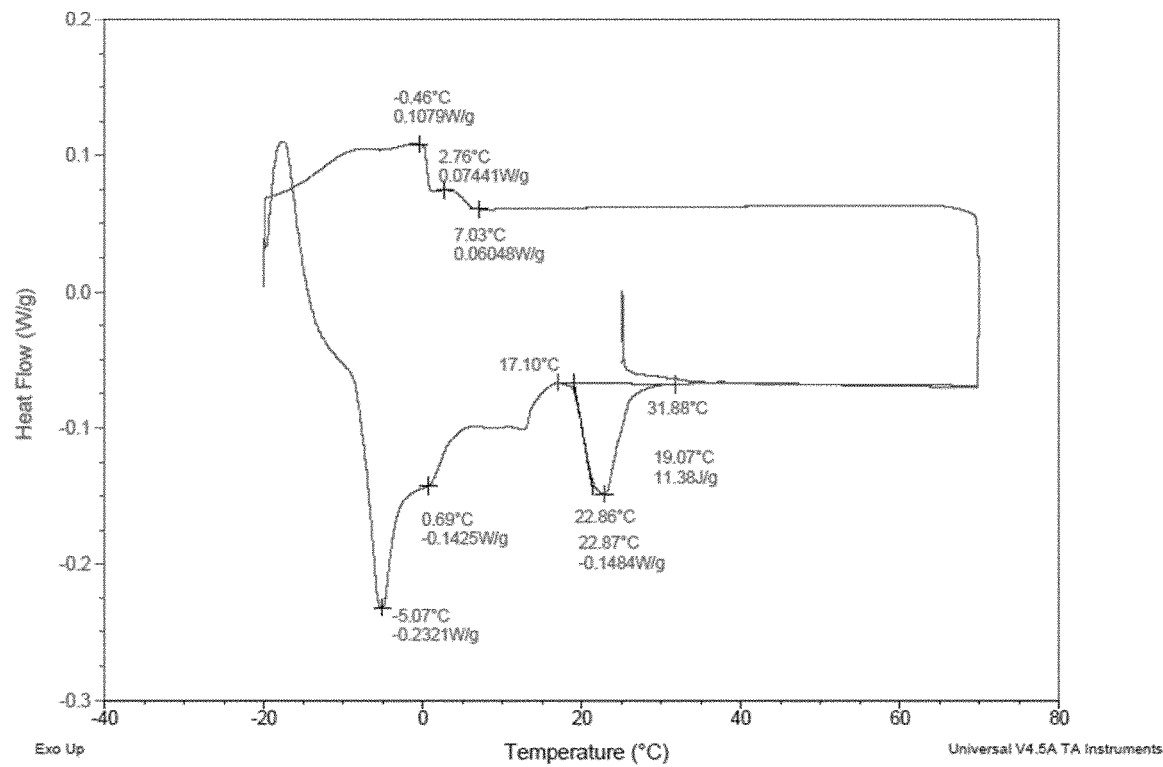
FIG. 1 shows a differential scanning calorimeter crystallization and melting trace for 20 wt. % cocoa butter in high oleic sunflower oil.

Consequently the present invention relates in part to an aerated fat-based confectionery material having a continuous lipid phase and a porosity of between 1 and 80%, for example between 10 and 75%, wherein, at a temperature at which the lipid phase has a solid lipid content between 0.1 and 80%, for example between 0.5 and 60%, for example between 0.5 and 40%, for example between 1 and 20%, for example between 5 and 20%, the fat-based confectionery material comprises gas bubbles having at least 50% of their surface occupied by crystals, the crystals comprising a glyceride selected from the group consisting of monoglycerides, diglycerides, triglycerides, esters of monoglycerides, esters of diglycerides and combinations of these. For example the crystals comprising a glyceride may be triglycerides.

In the context of the present invention the term aerated refers to material having a foam structure, for example a dispersion of a gas in a solid or liquid medium. The gas is not necessarily air. Triglycerides, also called triacylglycerols or triacylglycerides, are esters derived from glycerol and three fatty acids. Diglycerides are esters derived from glycerol and two fatty acids and monoglycerides are esters derived from glycerol and one fatty acid.

In the context of the invention, "fat-based confectionery materials" are understood to be edible materials comprising at least a fat and preferably a sugar. The term "edible" refers to substances which can be eaten safely. Whilst the current invention is not limited to substances permitted for consumption in any particular jurisdiction, edible compositions may for example comprise materials approved for human consumption by the U.S. Food and Drug Administration. The fat may be coconut oil, palm kernel oil, palm oil, cocoa butter, butter oil, lard, tallow, oil/fat fractions such as lauric or stearic fractions, hydrogenated oils, and blends thereof as well as sunflower oil, rapeseed oil, olive oil, soybean oil, fish oil, linseed oil, safflower oil, corn oil, algae oil, cottonseed oil, grape seed oil, nut oils such as hazelnut oil, walnut oil, rice bran oil, sesame oil, peanut oil, palm oil, palm kernel oil, coconut oil, & emerging seed oil crops such as high oleic sunflower oil, high oleic rapeseed, high oleic palm, high oleic soybean oils & high stearin sunflower or combinations thereof. The fat may for example be cocoa butter, cocoa butter substitute, cocoa butter replacers, cocoa butter improvers or cocoa butter equivalents, among others. The sugars may include sucrose, fructose, sugar replacers such as polyols (e.g., maltitol, lactitol, isomalt, erythritol, sorbitol, mannitol, xylitol) or bulking agents like polydextrose or other sweeteners like tagatose or high intensity sweeteners like saccharin, aspartame, acesulfame-K, cyclamate, neohesperidin, thaumathin, sucralose, alitame, neotame or any combination thereof. Fat-based confectionery materials may typically comprise sugar, milk derived components, and fat and solids from vegetable or cocoa sources in differing proportions. The fat-based confectionery material may comprise chocolate, including dark, milk or white chocolate. Alternatively the fat-based confectionery material may comprise any product or substance having rheological characteristics similar or substantially comparable to those of chocolate. Such a product may include chocolate substitutes containing direct cocoa butter replacements, stearines, coconut oil, palm oil, butter or any mixture thereof; nut pastes such as peanut butter; praline; confectioner's coatings also known as compound coatings, usually comprising chocolate analogues with cocoa butter replaced by a nontempering fat; or ice confectionery (e.g. ice-cream) coatings or inclusions, where the fats used in the material may have a lower melting point than those used in chocolate to provide a suitable texture at lower temperatures.

The percentage of the gas bubbles' surface occupied by crystals may be measured using microscopy (for example optical and/or confocal microscopy), coupled with suitable image analysis techniques. With a high level of surface coverage it may be immediately obvious after inspection by microscopy that at least 50% of the surface of the gas bubbles is occupied by crystals.

The aerated fat-based confectionery material of the invention may have a low moisture content, for example the aerated fat-based confectionery material may contain less than 5% water by weight, for example less than 2.5% water by weight. It should be noted that the aerated fat-based confectionery material of the present invention can be formed without moisture, for example without the use of surfactants in water or the formation of an emulsion containing water. Confectionery ingredients that are completely free from moisture are rare, but the aerated fat-based confectionery material of the invention may be essentially free from water.

The term porosity refers to the fraction of the volume of gas-filled voids over the total volume, as a percentage between 0 and 100%. The lipid phase of the foam may comprise lipidic solids, semisolids or liquids. The lipid phase of the foam may comprise glycerides such as water-insoluble esters of glycerol with fatty acids. The temperature at which the lipid phase has a solid lipid content between 0.1 and 80% may be measured by any methods well known in the art. For example the solid lipid content at different temperatures may be measured by pulsed NMR, for example according to the IUPAC Method 2.150. The solid lipid content at different temperatures may also be measured by differential scanning calorimetry. The result of a measurement of solid lipid content is commonly referred to as the solid fat content. Although it is possible to obtain solid lipid contents intermediate between 0 and 100% with pure lipid compositions by exploiting the kinetics of crystallization and heat transfer, in general it is preferable that the lipid phase comprises a mixture of different lipids with different melting points. Indeed, pure lipids are expensive and so are not preferred.

The crystals occupying at least 50% of the surface of the gas bubbles jam together, resisting any shrinkage of the bubbles and providing a stable, flowable foam when the continuous phase is fluid, such as when the lipid phase has a solid lipid content between 0.1 and 80%. The crystals occupying at least 50% of the surface of the gas bubbles may cause the bubbles to have a non-relaxing shape when the foams are diluted with oil. In the context of the present invention the term flowable foam refers to a foam which can be processed in pumping or stirring units using typical food process equipment without undergoing obvious structural coarsening or collapse. The flowable foam may be flowable under gravity after stirring (for example at 20° C.).

The fat-based confectionery material may comprise gas bubbles having their surface occupied by glycerides, for example glyceride crystals, such that the surface density is at least 15 mg·m$^{-2}$, for example at least 25 mg·m$^{-2}$ for example at least 50 mg·m$^{-2}$, for further example at least 200 mg·m$^{-2}$ Interfacial Area (S) Developed by a Foam:

$$S = \frac{6\phi V}{D}$$

V: volume of foam (m$^3$)
$\phi$: porosity
D: bubble Sauter diameter (m) as measured by optical microscopy/tomography Concentration of Adsorbed Glycerides at Interface:

$$c_{ads} = c_{ini} - c_{non-ads} \times X$$

$C_{ads}$: glyceride concentration, relative to the oil phase, adsorbed at the air-oil interface of the bubbles
$C_{ini}$: initial concentration of glyceride in the gel
$C_{non-ads}$: non-adsorbed glyceride concentration as titrated from the diluted subnatant
X: dilution factor applied to the foam before collecting the subnatant Adsorption Surface Density:

$$\Gamma = \frac{c_{ads}(1-\phi)V}{S}$$

The aerated fat-based confectionery material of the invention has a number of advantages. At temperatures where the continuous phase is fluid, the gas bubble stability makes it easy to process without damaging the foam. The composition of the aerated fat-based confectionery material may be adjusted so that there is a high proportion of liquid lipid at the temperature at which the aerated fat-based confectionery material is used, and this allows for soft textures while maintaining good stability. The inventors were surprised to find that the foam remains stable (at rest and during processing) when combined with other confectionery materials such as proteins, emulsifiers and particles.

The aerated fat-based confectionery material may be cooled such that the continuous lipid phase is no longer fluid. However, a characteristic of the aerated fat-based confectionery material is that, at a temperature at which the lipid phase has a solid lipid content between 0.1 and 80%, for example after re-heating, the foam still comprises gas bubbles having at least 50% of their surface occupied by crystals comprising a glyceride. This is in contrast to aerated fat-based confectionery materials which are simply stabilized by crystallizing the bulk. The crystals occupying the surface of the gas bubbles may comprise a glyceride selected from the group consisting of monoglycerides, diglycerides, triglycerides and combinations of these. The crystals occupying the surface of the gas bubbles may comprise triglycerides. The crystals occupying the surface of the gas bubbles may comprise glycerides having fatty acid groups of between 12 and 22 carbons. The crystals occupying the surface of the gas bubbles may comprise monoglycerides having fatty acid groups of between 12 and 22 carbons.

It is beneficial to be able to stabilize an aerated fat-based confectionery material having a continuous lipid phase without needing to use glycerides with high chain length fatty acids. Such high chain length fatty acids, especially saturated ones, affect the organoleptic properties of the aerated fat-based confectionery material, giving a heavy and waxy mouthfeel. The inventors were surprised to find that aerated fat-based confectionery materials according to the invention could be effectively stabilized without using glycerides with high chain length fatty acids, for example by using the process of the invention. The gas bubbles comprised within the aerated fat-based confectionery material of the invention may have their surface occupied by glycerides all of whose fatty acids have a carbon chain length less than 22. The gas bubbles comprised within the aerated fat-based confectionery material of the invention may have their surface occupied by glycerides all of which have an average fatty acid chain length less than 20. For example, the triglyceride palmitic-oleic-stearic (POSt) has an average chain length of 17.3 as palmitic acid is C16, oleic acid is C18 and stearic acid is C18.

The aerated fat-based confectionery material of the invention may contain more than 95% by weight of total lipids (for example more than 98%, for further example more than 99%) of glycerides all of whose fatty acids have a carbon chain length less than 22. The aerated fat-based confectionery material of the invention may contain more than 95% by weight of total lipids (for example more than 98%, for further example more than 99%) of glycerides all of whose fatty acids have an average chain length less than 20.

A high proportion of the lipid crystals in the aerated fat-based confectionery material of the invention occupy the surface of the gas bubbles at a temperature at which the lipid phase has a solid lipid content between 0.1 and 80%. For example, at least 50% by volume of the bubbles may have at least 50% of their surface occupied by crystals comprising glycerides. The lipid phase may comprise fats selected from the group consisting of cocoa butter, shea butter, illipe butter, sal nut oil, mango kernel fat, palm oil, coconut oil, soybean oil, rapeseed oil, cottonseed oil, sunflower oil, safflower oil, olive oil and hydrogenation products, interesterification products, fractions and combinations of these.

It is advantageous that the aeration of the fat-based confectionery material is stabilized by glycerides selected from the group consisting of monoglycerides, diglycerides, triglycerides, esters of monoglycerides, esters of diglycerides and combinations of these, as these are safe to use in confectionery products and do not provide an unpleasant taste. At a temperature at which the lipid phase has a solid lipid content between 0.1 and 80%, the aerated fat-based confectionery material may comprises gas bubbles having at least 50% of their surface occupied by glyceride crystals. The fat-based confectionery material may comprise between 20 and 90 wt. % lipid, for example between 25 and 87 wt. % lipid, for example between 35 and 85 wt. % lipid The lipid phase may comprise at least 50 wt. % triglycerides, for example at least 70 wt. % triglycerides for example at least 95 wt. % triglycerides. The fat-based confectionery material may comprise at least 10 wt. % triglycerides, for example at least 20 wt. % triglycerides.

The crystallization behaviour of the lipid phase may be examined using differential scanning calorimetry (DSC), a technique in which the difference in the amount of heat required to increase the temperature of a sample and reference is measured as a function of temperature. For example, a sample comprising the lipid phase may be heated to completely melt all the lipid, cooled to record the crystallization signature and then reheated to record the melting signature. When the cooling protocol brings the mixture so low in temperature that the system solidifies in bulk then the lipid phase in the foam of the current invention may show at least two distinct endothermic melting "peaks" during the reheating phase, the at least two endothermic melting "peaks" being separated by at least 10° C., for example at least 15° C., for example at least 20° C. The area under each of the at least two peaks may be at least 10% of the area under all peaks in the melting trace. Depending on the DSC equipment used, endothermic heat flows may be shown as positive or negative peaks.

The inventors have found that good results may be obtained using a fat or blend of fats having a broad range of crystallization temperatures. Such fats or blends of fats have broad ranges of crystallization peaks when measured in a differential scanning calorimeter (DSC). These broad ranges of crystallization temperatures allow flexibility in selecting a temperature at which the lipid phase has a solid lipid content between 0.1 and 80% (for example between 0.1 and 60%, for example between 0.5 and 40%, for example between 1 and 20%, for example between 5 and 20%) before aerating the composition. DSC measurements of fats may conveniently be carried out between 80° C. and −20° C. The lipid phase in the confectionery of the invention may have at least 80% of its total crystallization enthalpy between 80° C. and −20° C. occurring in a temperature range of at least 20° C., for example a range of at least 30° C. The lipid phase in the confectionery of the invention may have at least 50% of its total crystallization enthalpy between 80° C. and −20° C. occurring in a temperature range between 40° C. and 15° C., for example at least 80% of its total crystallization enthalpy between 80° C. and −20° C. occurring in a temperature range between 40° C. and 15° C. The lipid phase in the confectionery of the invention may have at least 50% of its total crystallization enthalpy between 80° C. and −20° C.

occurring in a temperature range between 20° C. and −5° C., for example at least 80% of its total crystallization enthalpy between 80° C. and −20° C. occurring in a temperature range between 20° C. and −5° C. Crystallization enthalpy measurements may for example be measured by DSC.

The crystals comprising a glyceride occupying the surface of the gas bubbles in the foam according to the invention may form layers having an average thickness below 5 µm, for example between 0.2 and 5 µm. The lipid crystals comprising triglycerides occupying the surface of the gas bubbles in the foam according to the invention may form layers having an average thickness below 2 µm, for example between 0.2 and 2 µm. The lipid crystals comprising glycerides occupying the surface of the gas bubbles in the foam according to the invention may form layers having an average thickness between 0.01 µm and 5 µm, for example between 0.05 µm and 2 µm, for further example between 0.2 µm and 1 µm. Thin layers of crystals provide an advantage as a smaller amount of crystals are required to wrap the bubbles and hence a smaller amount of higher melting components. As the bubble size in a foam decreases, for the same volume of gas in the foam overall the surface area of the bubbles increases, and so more crystals would be needed to coat the bubbles. As the invention provides gas bubbles coated with thin layers of crystals, foams with low densities can be formed with a small bubble size, providing interesting and attractive textures.

The aerated fat-based confectionery material of the invention does not rely on a rigid network in the continuous phase for its stability. This means that, at temperatures where a high proportion of the lipid phase is liquid, the aerated fat-based confectionery material is stable yet can be soft and flowable. Accordingly, the aerated fat-based confectionery material of the invention may have no rigid network in the continuous lipid phase at a temperature at which the lipid phase has a solid lipid content between 0.1 and 80%. For example the aerated fat-based confectionery material, at a temperature at which the lipid phase has a solid lipid content between 0.1 and 80% (for example between 0.1 and 60%, for example between 0.5 and 40%, for example between 1 and 20%, for example between 5 and 20%), may flow under gravity without losing more than 10% of its porosity (for example without losing more than 5% of its porosity). A rigid network is present when flow induces partial instability of the structure. On applying shear to a rigid network, a solid type of initial flow is observed. For example if a system having a rigid network is sheared in a rheometer, an initial resistance of elastic (or rigid) type would be observed, followed by a transition through maximal resistance (breakage of the rigid structure) before the structure would return to being flowable (at least in part). The transition is then not rapidly reversible (no rapid recovery of the rigid network e.g. within a few seconds or minutes). This is in contrast to the behaviour of foams having no rigid network.

Most lipid materials used commercially are mixtures of different molecules. Vegetable and animal fats for example contain a range of different glycerides. As a consequence, when cooling these fats, a fraction of the fat will start to crystalize while the rest of the fat remains liquid. The inventors have found that by cooling liquid fats so that part of the lipids crystallize and a gel forms, and then aerating the gel, a stable foam may be produced. The gel structure may continue to develop during and after foaming. The inventors found for example that on cooling olive oil to −23° C. a gel forms. Whipping the gel creates a stable foam with gas bubbles having their surface occupied by glyceride crystals. For ease of processing, the temperature may be raised before whipping, as long as some crystals and the gel remain. For example the inventors were able to whip the olive oil gel at 5° C. In such a foam, no additional stabilizer material needs to be added to the liquid fat to enable a foam to be formed. Accordingly, in one embodiment of the invention, the lipid phase comprises one or more fats and the crystals comprising glycerides occupying the surface of the gas bubbles comprise glycerides from all the one or more fats. The fats may be vegetable fats. The fats may be selected from the group consisting of cocoa butter, olive oil, high stearic sunflower oil and combinations of these. The composition of glycerides occupying surface of the gas bubbles may be richer in higher melting glycerides than the bulk fat. In the context of the current invention the terms oils and fats are used interchangeably. Conventionally in industry, the term oil is used for fats which are liquid at the temperature at which they are traditionally sold.

In another embodiment of the invention, one or more higher melting-point lipid ingredients may be included in the lipid phase of the aerated fat-based confectionery material to promote the formation of crystals to occupy the surface of the gas bubbles when the majority of the lipid phase is still liquid. The invention may provide an aerated fat-based confectionery material wherein the lipid phase comprises one or more higher melting-point (HMP) lipid ingredients and one or more lower melting-point (LMP) lipid ingredients and wherein the melting-point of the lowest melting higher melting-point lipid ingredient is at least 10° C., for example at least 15° C., for example at least 20° C., above that of the melting point of the highest melting lower melting-point lipid ingredient and wherein the lower melting-point lipid ingredients are present at a level of greater than 50 wt. % of the total lipid in the lipid phase, for example greater than 60 wt. %, for example greater than 70 wt. %, for example greater than 90 wt. %. A lipid phase composition as described facilitates the formation and stability of the aerated fat-based confectionery material, with crystals from the higher melting-point lipid ingredients occupying the gas bubble surfaces while the lower melting-point lipid ingredients maintain a fluid continuous phase to enable aeration, for example by whipping.

Consider a lipid phase which consists of 6 wt. % Dimodan HR (mpt. 72° C.), 40 wt. % cocoa butter (mpt. 35° C.) and 54 wt. % high oleic sunflower oil (mpt. −17° C.). The lipid phase has two HMP lipid ingredients (Dimodan HR and cocoa butter) and one LMP lipid ingredient (high oleic sunflower oil). The melting point of the lowest melting HMP lipid ingredient (cocoa butter) is 35° C., which is at least 10° C. above that of the melting point of the highest melting LMP lipid ingredient, i.e. high oleic sunflower oil with a melting point of −17° C. The LMP lipid ingredient (HOSFO) is present at 54 wt. % of the total lipid.

For different product applications and usage temperatures, the melting points of the lipid ingredients in the lipid phase may vary. The melting-point of the lowest melting HMP lipid ingredient may be above 10° C., for example above 20° C., for example above 30° C., for example above 40° C. A combination of a small quantity of high melting lipid ingredient with a large amount of low melting lipid ingredient can provide a stable foam at room temperature and below which is particularly beneficial for aerated fat-based confectionery materials as they achieve stability without causing excessive waxiness in the mouth, and without an unwanted increase in saturated fat content. For example, the melting-point of the lowest melting HMP lipid ingredient may be above 40° C., for example between 40 and 90° C., and the lower melting-point lipid ingredients may be present at a level of greater than 90 wt. %. For example, the melting-point of the lowest melting HMP lipid ingredient may be above 30° C., for example between 30 and 50° C., and the lower melting-point lipid ingredients may be present at a level of greater than 75 wt. %. The crystals occupying the surface of the gas bubbles may comprise glycerides from the HMP lipid ingredients. Lipid ingredients present in minor quantities with melting-points between the temperature of the lowest melting HMP lipid ingredient and the highest melting LMP lipid ingredients do not significantly affect the efficiency of foam formation. The melting-point of the lowest melting higher melting-point lipid ingredient may be at least 10° C., for example at least 15° C., for example at least 20° C., above that of the melting point of the highest melting lower melting-point lipid ingredient when lipid ingredients present at levels below 1 wt. % of the lipid content of the lipid phase are discounted. The melting-point of a fat may for example be the temperature at which it has a 1% solid fat content as measured by pulsed NMR.

The one or more higher melting-point lipid ingredients in the aerated fat-based confectionery material of the invention may be selected from the group consisting of monoglycerides, diglycerides, esters of monoglycerides, esters of diglycerides, cocoa butter, shea butter, illipe butter, sal nut oil, mango kernel fat, palm kernel oil, palm oil, coconut oil, milk fat, high stearic sunflower oil and hydrogenation products, inter-esterification products, fractions and combinations of these; and the one or more lower melting-point lipid ingredients may be selected from the group comprising sunflower oil (high oleic and standard), coconut oil, safflower oil, rapeseed oil, olive oil and combinations and fractions of these. The one or more higher melting-point lipid ingredients in the aerated fat-based confectionery material of the invention may be selected from the group consisting of monoglycerides, diglycerides, cocoa butter, shea butter, illipe butter, sal nut oil, mango kernel fat, palm kernel oil, palm oil, coconut oil, milk fat, high stearic sunflower oil and hydrogenation products, inter-esterification products, fractions and combinations of these; and the one or more lower melting-point lipid ingredients may be selected from the group comprising sunflower oil (high oleic and standard), coconut oil, safflower oil, rapeseed oil, olive oil and combinations and fractions of these. The one or more higher melting-point lipid ingredients in the aerated fat-based confectionery material of the invention may be selected from the group consisting of cocoa butter, shea butter, illipe butter, sal nut oil, mango kernel fat, palm kernel oil, palm oil, coconut oil, milk fat, high stearic sunflower oil and hydrogenation products, inter-esterification products, fractions and combinations of these; and the one or more lower melting-point lipid ingredients may be selected from the group comprising sunflower oil (high oleic and standard), coconut oil, safflower oil, rapeseed oil, olive oil and combinations and fractions of these. The one or more higher melting-point lipid ingredients in the aerated fat-based confectionery material of the invention may have a melting point above 20° C. and the one or more lower melting-point lipid ingredients in the aerated fat-based confectionery material of the invention may have a melting point below 20° C.

The higher melting-point lipid ingredients in the aerated fat-based confectionery material of the invention may comprise monoglycerides, for example monoglycerides having fatty acid groups of between 12 and 22 carbons, and the lower melting-point lipid ingredients in the aerated fat-based confectionery material of the invention may comprise sunflower oil, for example high oleic sunflower oil. The higher melting-point lipid ingredients in the aerated fat-based confectionery material of the invention may comprise monoglycerides, for example monoglycerides having fatty acid groups of between 12 and 22 carbons, and the lower melting-point lipid ingredients in the aerated fat-based confectionery material of the invention may comprise coconut oil. The higher melting-point lipid ingredients in the aerated fat-based confectionery material of the invention may comprise a mixture of monoglycerides and diglycerides, and the lower melting-point lipid ingredients in the aerated fat-based confectionery material of the invention may comprise sunflower oil, for example high oleic sunflower oil. The higher melting-point lipid ingredients in the aerated fat-based confectionery material of the invention may comprise esters of monoglycerides and esters of diglycerides, for example lactic acid esters of monoglycerides and diglycerides or acetic acid esters of monoglycerides and diglycerides, and the lower melting-point lipid ingredients in the aerated fat-based confectionery material of the invention may comprise sunflower oil, for example high oleic sunflower oil.

The higher melting-point lipid ingredients in the aerated fat-based confectionery material of the invention may comprise cocoa butter, for example inter-esterified cocoa butter, and the lower melting-point lipid ingredients in the aerated fat-based confectionery material of the invention may comprise sunflower oil, for example high oleic sunflower oil. The higher melting-point lipid ingredients in the aerated fat-based confectionery material of the invention may comprise a high melting fraction of palm oil, and the lower melting-point lipid ingredients in the aerated fat-based confectionery material of the invention may comprise sunflower oil, for example high oleic sunflower oil. The higher melting-point lipid ingredients in the aerated fat-based confectionery material of the invention may comprise hydrogenated coconut oil and the lower melting-point lipid ingredients in the aerated fat-based confectionery material of the invention may comprise sunflower oil, for example high oleic sunflower oil. The higher melting-point lipid ingredients in the aerated fat-based confectionery material of the invention may comprise hydrogenated palm kernel oil and the lower melting-point lipid ingredients in the aerated fat-based confectionery material of the invention may comprise sunflower oil, for example high oleic sunflower oil. The higher melting-point lipid ingredients in the aerated fat-based confectionery material of the invention may comprise shea butter, for example fractionated or interesterified shea butter, and the lower melting-point lipid ingredients in the aerated fat-based confectionery material of the invention may comprise sunflower oil, for example high oleic sunflower oil. The higher melting-point lipid ingredients in the aerated fat-based confectionery material of the invention may comprise illipe butter, for example fractionated or interesterified illipe butter, and the lower melting-point lipid ingredients in the aerated fat-based confectionery material of the invention may comprise sunflower oil, for example high oleic sunflower oil. The higher melting-point lipid ingredients in the aerated fat-based confectionery material of the invention may comprise high stearic sunflower oil stearin, and the lower melting-point lipid ingredients in the aerated fat-based confectionery material of the invention may comprise high oleic sunflower oil.

The inventors have found that the addition of particles may aid the foam stability of the aerated fat-based confectionery material, reducing coarsening over time and providing better foam homogeneity. Solid particles having a particle size of less than 500 µm may be dispersed in the aerated fat-based confectionery material. Particle size may be measured by the methods known in the art consistent with the size being measured. For example, a particle size less than 500 µm may be confirmed by passage through a standard US sieve mesh 35. The solid particles dispersed in the foam may have a particle size less than 180 µm (e.g. measured by passage through US mesh 80). The solid particles dispersed in the foam may have a D90 particle size measured by laser light scattering of less than 100 µm, for example less than 50 µm, for example less than 30 µm. The solid particles dispersed in the aerated fat-based confectionery material may be selected from the group consisting of modified starch, maltodextrin, inorganic salt (for example edible inorganic salt), protein particles, fibres (for example slowly digestible or digestion resistant carbohydrates), plant particles (for example cocoa particles, coffee particles, spices or herbs), sugars (for example sucrose), hydrogel particles and combinations of these. The solid particles dispersed in the aerated fat-based confectionery material may be maltodextrin. The solid particles may be present at a level of between 1 and 500% of the total lipid weight in the foam, for example between 1 and 200% of the total lipid weight in the foam, for example between 1 and 100% of the total lipid weight in the foam, for example between 1 and 20% of the total lipid weight in the foam, for further example between 5 and 20% of the total lipid weight in the foam.

The aerated fat-based confectionery material may be a spread, a coating, an inclusion, a filling or a topping. Spreads are typically applied to bread, and may for example contain chocolate and ground roasted hazelnuts. Coatings may be applied by any of the methods well known in the confectionery industry, for example by enrobing, dipping, moulding, panning (e.g. in a revolving coating pan) or spraying. In the present invention the term inclusion refers to a piece of confectionery material at least partially enclosed in another confectionery component. For example, chocolate chips in a biscuit or a core of fat-based confectionery material in the centre of an ice-cream. Fillings may be for example a soft-centre in a shell-moulded chocolate, a filling in a sandwich biscuit, a wafer filling, or a co-extruded filling in a cereal tube or pillow. Fillings according to the invention were found to be firmer than when the same ingredients were prepared without aeration. Toppings may for example be a soft foam on a dessert or beverage, a layer applied to a cake in the manner of icing or pieces of fat-based confectionery material sprinkled onto an ice-cream as decoration.

Typically, lower melting lipid ingredients have lower levels of saturated fatty acids than higher melting lipid ingredients. Consumption of saturated fatty acids have been linked to increased levels of LDL cholesterol in the blood and heart diseases. It is advantageous to be able to provide fat-based confectionery materials with lower levels of saturated fatty acids. By being able to create a foam from a lipid phase with a high percentage of lower melting lipid ingredients the invention provides a means to reduce the saturated fatty acid content of fat-based confectionery materials. The aerated fat-based confectionery material of the invention may be low in saturated fatty acids, for example the aerated fat-based confectionery material of the invention may have a saturated fatty acid content of less than 45 wt. % of the total fatty acid content, for example less than 35 wt. % of the total fatty acid content. As the fat-based confectionery material of the invention is aerated, it provides an equivalent volume for less weight of material and hence reduces the total fat and therefore the saturated fatty acid content of any confectionery product comprising it. The aerated fat-based confectionery material may further comprise sucrose, milk solids and cocoa solids.

The aerated fat-based confectionery material of the invention may be an ice confectionery material. For example the aerated fat-based confectionery material may be a coating on, or an inclusion in, an ice cream, mellorine (non-dairy alternative to ice cream), frozen yogurt, frozen mousse, frozen fudge, frozen custard, fruit sorbet or sherbet.

The aerated fat-based ice confectionery material of the invention may have a lipid content of between 30 and 90 wt. %, for example between 50 and 87 wt. %, for example between 60 and 85 wt. %. The aerated fat-based confectionery material may be an ice confectionery material wherein saturated monoglycerides with fatty acid chain lengths between C16 and C20 may be between 0.1 and 10 wt. % of the total lipid, for example between 2 and 8 wt. % of the total lipid.

In a further aspect, the invention provides a confectionery product comprising the aerated fat-based confectionery material of the invention. The confectionery product may be an ice confectionery product, for example an ice cream, mellorine, frozen yogurt, frozen mousse, frozen fudge, frozen custard, fruit sorbet or sherbet; a biscuit, for example a filled biscuit such as a sandwich wafer; chocolate-style confectionery such as a moulded tablet, a sweet in a chocolate assortment or an enrobed countline bar; sugar confectionery such as a rope-formed centre-filled high boil sweet with a fat-based confectionery filling; or a confectionery product included in a breakfast cereal, for example a cereal pillow filled with aerated chocolate, it being beneficial to be able to minimize the amount of sugar and fat added to breakfast cereal while still providing an attractive product.

In a further aspect, the invention provides a process for forming an aerated fat-based confectionery material, the process comprising the steps of providing a composition having a lipid content greater than 20 wt. %, for example greater than 30 wt. %, for example greater than 50 wt. %, for example greater than 60 wt. %; controlling the temperature of the composition such that the composition comprises glyceride crystals, has a solid lipid content between 0.1 and 80% (for example between 0.5 and 60%, for example between 0.5 and 40%, for example between 1 and 20%, for example between 5 and 20%) and forms a gel; and aerating the gel, for example to form a foam. The aerated fat-based confectionery material may comprise gas bubbles having their surface occupied by crystals comprising glycerides. In the context of the present invention the term aerating refers to foaming by the incorporation of gas bubbles, the gas not necessarily being air. Aeration may be achieved by any of the techniques known in industry, for example mechanical agitation, passive mixing (e.g. passing through slit or nozzle), pressure drop (e.g. to vacuum, or from elevated pressure to atmospheric pressure) or sparging (when a chemically inert gas is bubbled through a liquid).

A gel is a non-fluid network characterised by a continuous liquid throughout its whole volume. The gel of the process of the invention may have a continuous lipid phase. The gel of the process of the invention may have a gel property arising from a crystal network, for example a network of crystals of average size below 100 microns throughout the matrix. The gel of the process of the invention may have between 3 and 30% of the total lipid by weight in the form of crystals, for example between 5 and 20%. A gel may be defined by its rheology. For example at a frequency of 1 Hz, the measured linear shear elastic modulus $G'$ of a gel may be greater than 10 Pa and the viscous modulus $G''$ may be less than $G'$. Gels most suitable for foam generation have a linear shear elastic modulus $G'$ initially in the range $10^2$-$10^7$ Pa at 1 Hz, for example a linear shear elastic modulus $G'$ initially in the range $10^2$-$10^6$ Pa at 1 Hz, for further example a linear shear elastic modulus G' initially in the range $10^3$-$10^6$ Pa at 1 Hz.

The composition may comprise a range of different lipid ingredients with different melting points. The crystallization behaviour of the composition may be examined using differential scanning calorimetry (DSC). Aeration may be performed at a temperature below the highest melting peak maximum, the temperature being such that the solid lipid content is between 0.1 and 80%, preferably at a temperature below the whole peak area of the highest endothermic melting peak. For example, in a mixture of 20% cocoa butter in high oleic sunflower oil, the highest melting peak was found to have a maximum at 23° C. Good results were obtained by aerating the mixture which had been recently cooled to a temperature of 17° C., the solid lipid content being between 0.1 and 80%.

The composition in the process of the invention may comprise one or more higher melting-point (HMP) lipid ingredients and one or more lower melting-point (LMP) lipid ingredients wherein the melting-point of the lowest melting higher melting-point lipid ingredients is at least 10° C., for example at least 15° C., for example at least 20° C., above that of the melting point of the highest melting lower melting-point lipid ingredients and wherein the lower melting-point fats are present at a level of greater than 50 wt. % of the total lipid in the lipid phase, for example greater than 60 wt. %, for example greater than 70 wt. %, for example greater than 90 wt. %.

The lipid phase of the composition in the process of the invention may have at least 80% of its total crystallization enthalpy between 80° C. and −20° C. occurring in a temperature range of at least 20° C., for example a range of at least 30° C. The lipid phase of the composition in the process of the invention may have at least 50% of its total crystallization enthalpy between 80° C. and −20° C. occurring in a temperature range between 40° C. and 15° C., for example at least 80% of its total crystallization enthalpy between 80° C. and −20° C. occurring in a temperature range between 40° C. and 15° C. The lipid phase of the composition in the process of the invention may have at least 50% of its total crystallization enthalpy between 80° C. and −20° C. occurring in a temperature range between 20° C. and −5° C., for example at least 80% of its total crystallization enthalpy between 80° C. and −20° C. occurring in a temperature range between 20° C. and −5° C.

Solid particles having a particle size of less than 500 μm, for example less than 180 μm, may be added to the composition in the process of the invention. The solid particles may have a D90 particle size of less than 100 μm, for example less than 50 μm, for example less than 30 μm. The solid particles may be added before the composition forms a gel. The composition may contain no solid particles before solid particles are added to the composition in the process of the invention. The solid particles added to the composition may be selected from the group consisting of modified starch, maltodextrin, inorganic salt, protein particles, fibres, plant particles, sugars, hydrogel particles and combinations of these. The solid particles may have been ground or aggregated. The solid particles added to the composition may be maltodextrin. The solid particles may be present at a level of between 1 and 20% of the total lipid weight in the aerated fat-based confectionery material.

Cooling the composition will promote the formation of crystals. This can be enhanced by the addition of small glyceride crystals, for example glyceride crystals of a higher melting-point lipid ingredient. The added glyceride crystals may themselves occupy the surface of the gas bubbles when the gel is aerated, or they may promote the growth of glyceride crystals which occupy the surface of the gas bubbles or a mixture of both. Accordingly, glyceride crystals may be added to the composition in the process of the invention, for example they may be added whilst controlling the temperature of the lipid composition such that the composition has a solid lipid content between 0.1 and 80% and the composition forms a gel. The glyceride crystals may be selected from the group consisting of monoglycerides, diglycerides, triglycerides, esters of monoglycerides, esters of diglycerides and combinations of these.

The composition may initially be at a temperature at which it contains less than 0.1% solid lipid in the process of the invention. For example it may be at a temperature at which it contains no solid lipid. Starting with less than 0.1% solid lipid, or no solid lipid, makes it easier to control the conditions such that a proportion of the composition crystallizes, providing suitable glyceride crystals for occupying the surface of gas bubbles in the foam generated by the process of the invention.

The inventors have found that improved results (e.g. lower density foams and greater stability) may be obtained if the gel is allowed to mature before being aerated. There may be a time interval of at least 5 minutes between the formation of the gel and the start of the aeration in the process of the invention. The time interval between the formation of the gel and the start of the aeration in the process of the invention may be at least 30 minutes, for example at least 1 hour, for example at least 24 hours, for example at least 4 weeks. The gel may be maintained at any temperature during the time between formation of the gel and the start of the aeration as long as the composition maintains a solid lipid content between 0.1 and 80%. The inventors have found that the higher the temperature of the gel when it is whipped, the lower the density of foam obtained, providing the temperature is not raised to the point that all lipid crystals melt and the gel is destroyed. For example, the composition comprising may be cooled rapidly, such as in a freezer at −18° C. to form a gel, and then allowed to warm up to a temperature at which only a few percent solid lipid remains before being aerated.

The aeration step in the process of the invention may comprise mechanical agitation, for example whipping. The inventors have found that although foams could be obtained by non-mechanical agitation methods, such as dissolving or dispersing gas under pressure and then releasing it, to obtain the most stable foams it was preferable to apply mechanical agitation. Without wishing to be constrained by theory, the inventors believe that mechanical agitation increases the wrapping of the gas bubbles with lipid crystals. Mechanical agitation may for example be applied using rotor-stator type of equipment, such as a Haas-Mondomix aerating system. After formation, and maturation (if any), the gel may be gently sheared to allow an easy transfer to the aerating system. Mechanical agitation, for example whipping, may be applied for at least 5 s (such as the residence times in a continuous rotor-stator system), for example at least 1 minute, for example at least 5 minutes (such as in a batch whipping machine), for example at least 10 minutes. Foam stability generally increases with increasing mechanical agitation time. In contrast to many foams, the foam generated according to the process of the invention is not particularly sensitive to over-whipping. The aeration step in the process of the invention may comprise gas depressurization followed by mechanical whipping. Such a combination of initial bubble generation using dissolved/dispersed gas and a pressure drop followed by mechanical agitation may usefully be employed, however all process steps may be performed at or near atmospheric pressure, for example between 800 hPa and 2100 hPa, for example between 850 hPa and 1100 hPa.

The process of the invention may further comprise adding additional materials. The aerated fat-based confectionery material may be incorporated into a confectionery product. For example the process may include adding additional confectionery ingredients and forming a confectionery product. The process may include adding additional materials before the formation of the gel, after a gel is formed, or to the aerated composition generated by aerating the gel. The process of the invention may comprise the step of adding a non-aerated fat-based confectionery material to the composition. The process may comprise the step of adding an un-aerated fat-based confectionery material to the composition after the formation of the gel. The aerated composition resulting from the process of the invention may be mixed with un-aerated fat-based confectionery material. The process may comprise the steps of providing a composition consisting of lipids and comprising glycerides selected from the group consisting of monoglycerides, diglycerides, triglycerides, esters of monoglycerides, esters of diglycerides and combinations of these; controlling the temperature of the composition such that the composition comprises glyceride crystals, has a solid lipid content between 0.1 and 80% and forms a gel; adding a non-aerated fat-based confectionery material to the gel; then aerating the gel.

The aerated fat-based confectionery material obtained in the process of the invention by aerating the gel may be mixed with un-aerated composition, for example the aerated fat-based confectionery material may be mixed with an un-aerated composition having a lipid continuous phase. Such a "two-step" process is particularly effective at creating an aerated fat-based confectionery material having a low lipid content when the initial aerated fat-based confectionery material obtained in the process of the invention has a lipid content higher than the un-aerated composition that it is mixed with. Lipid-continuous compositions with low lipid contents are difficult to aerate, as the foam structure tends to break during whipping. The inventors were surprised to find that by creating an initial aerated fat-based confectionery material according to the process of the invention using a composition with a high lipid content and then carefully mixing the aerated fat-based confectionery material with an un-aerated material having a lower fat content they could obtain much higher porosity than could be obtained by whipping the final composition directly. Without wishing to be bound by theory, the inventors believe that the formation of crystal-wrapped bubbles in the initial aerated material provides a foam with good stability during mixing, allowing it to be mixed into un-aerated material with very little loss of porosity. The process of the invention may comprise the steps of providing a composition having a lipid content greater than 40 wt. %; controlling the temperature of the composition such that the composition comprises glyceride crystals, has a solid lipid content between 0.1 and 80% (for example between 0.1 and 60%, for example between 0.5 and 40%, for example between 1 and 20%, for example between 5 and 20%), and forms a gel; aerating the gel to form an initial aerated fat-based confectionery material; and mixing the initial aerated fat-based confectionery material with an un-aerated lipid-continuous composition having a lipid content lower than 40 wt. % to form a further aerated fat-based confectionery material. The further aerated fat-based confectionery material formed by mixing the initial aerated fat-based confectionery material with an un-aerated lipid-continuous composition may have a lipid content below 40 wt. %, for example below 35 wt. %, for further example below 30 wt. %. The aerated fat-based confectionery materials may comprise gas bubbles having their surface occupied by crystals comprising glycerides. In the context of the present invention, the term "un-aerated" refers to a composition having a porosity below 1%, for example the un-aerated lipid-continuous composition may have a porosity in the lipid phase of less than 1%.

The temperature of the composition may be controlled to form a gel, for example by rapid cooling, and then further ingredients mixed in, acting to increase the temperature of the gel ready for efficient aeration, but without melting out all the solid lipid content. It is an advantage of the process of the invention that it provides a foam with good stability such that additional ingredients may be mixed into the aerated composition without leading to too great an increase in density. The aerated composition generated by the process of the invention may be allowed to mature before additional ingredients are added. For example the time interval between the formation of the foam and the addition of further ingredients, may be at least 30 minutes, for example at least 1 hour, for example at least 24 hours, for example at least 4 weeks.

In an embodiment of the process of invention, the process may comprise the steps of providing a composition having a cocoa butter content between 10 and 50% by weight (for example between 15 and 25% by weight) and a lower melting-point fat content between 50 and 90% by weight (for example between 85 and 50% by weight), wherein the lower melting-point fat has a melting point below 0° C. (for example below −10° C.); cooling the composition to a temperature between 0 and 15° C. such that the composition comprises glyceride crystals, has a solid lipid content between 0.1 and 80% (for example between 5 and 20%) and forms a gel; and aerating the gel (for example by mechanical whipping) to form a foam. The composition may be free from lipid crystals before being cooled. The resulting foam may optionally be mixed with an un-aerated lipid-continuous composition.

In a further embodiment of the process of invention, the process may comprise the steps of providing a composition having a higher melting-point fat content between 10 and 50% by weight (for example between 15 and 25% by weight) and a lower melting-point fat content between 50 and 90% by weight (for example between 85 and 50% by weight), wherein the higher melting-point fat has a melting point between 35 and 65° C. (for example between 40 and 50° C.) and the lower melting-point fat has a melting point between below 0° C. (for example below −10° C.); cooling the composition to a temperature between 0 and 25° C. (for example between 0 and 20° C.) such that the composition comprises glyceride crystals, has a solid lipid content between 0.1 and 80% (for example between 5 and 20%) and forms a gel; and aerating the gel (for example by mechanical whipping) to form a foam. The composition may be free from lipid crystals before being cooled. The resulting foam may optionally be mixed with an un-aerated lipid-continuous composition.

In a further embodiment of the process of invention, the process may comprise the steps of providing a composition having between 15 and 25% by weight of monoglycerides and a lower melting-point fat content between 75 and 85% by weight, wherein the monoglycerides have a melting point between 65 and 85° C. (for example between 70 and 80° C.) and the lower melting-point fat has a melting point between below −15° C.; cooling the composition to a temperature between −15° C. and 0° C. such that the composition comprises glyceride crystals, has a solid lipid content between 0.1 and 80% (for example between 5 and 20%) and forms a gel; and aerating the gel (for example by mechanical whipping) to form a foam. The composition may be free from lipid crystals before being cooled. The resulting foam may optionally be mixed with an un-aerated lipid-continuous composition.

In a still further embodiment of the process of invention, the process may comprise the steps of providing a composition having between 15 and 25% by weight of monoglycerides and a lower melting-point fat content between 75 and 85% by weight, wherein the monoglycerides have a melting point between 65 and 85° C. (for example between 70 and 80° C.) and the lower melting-point fat has a melting point between below 0° C. (for example below −10° C.); cooling the composition to a temperature between 10° C. and 30° C. such that the composition comprises glyceride crystals, has a solid lipid content between 0.1 and 80% (for example between 5 and 20%) and forms a gel; and aerating the gel (for example by mechanical whipping) to form a foam. The composition may be free from lipid crystals before being cooled. The resulting foam may optionally be mixed with an un-aerated lipid-continuous composition.

Those skilled in the art will understand that they can freely combine all features of the present invention disclosed herein. In particular, features described for the product of the present invention may be combined with the process of the present invention and vice versa. Further, features described for different embodiments of the present invention may be combined. Where known equivalents exist to specific features, such equivalents are incorporated as if specifically referred to in this specification. Further advantages and features of the present invention are apparent from the figures and non-limiting examples.

EXAMPLES

Example 1: Formation of Stable Foams with Cocoa Butter in High Oleic Sunflower Oil High Oleic Sunflower Oil (HOSFO) having a melting point of −17° C. (±3)° C. was obtained from (SABO Nestrade). Cocoa butter (Pure Prime Pressed) having a melting point of 35° C. (±3)° C. was obtained from Cargill.

The melting and crystallizing profile of 20 wt. % cocoa butter in HOSFO was measured by DSC using a SDT Q600 from TA instruments. A sample of around 10-20 mg of cocoa butter in HOSFO was heated to 70° C. before recording the crystallization signature. After cooling to −20° C., it was reheated to 70° C. to record the melting signature. The DSC trace is shown in FIG. 1. It can be seen that the highest melting peak has a peak maximum at about 23° C. and the peak starts at around 17° C. Although different lipids and crystalline forms may have slightly different specific melting enthalpies, the area under the melting peaks in the reheating trace provides a reasonable correlation with the quantity of lipid melting. From the DSC reheating trace it can be seen that by 5° C. less than 60% of the lipid remains solid.

1.1 Gel at 4° C., Whipping at 20° C.

Mix preparation: 20% (w/w) cocoa butter in HOSFO was heated to 70° C. until complete dissolution. 250 g of the heated solution was placed in a double-jacketed glass container. The mixture was cooled down over 20 hours by applying water at 4° C. to the jacket. The gel obtained was placed at 20° C. in a Hobart N50 planetary kitchen mixer fitted with a balloon whisk at speed 2 for 15, 30, 45 min. A foam with an overrun of 240% was obtained. (Overrun is the volume of gas incorporated into the foamed material/volume of the un-foamed material, expressed in %.) The bubble size distribution was wide, with an average size estimated in the range 0.02-0.05 mm, but with only a very small fraction (less than 5%) of bubbles larger than 0.1 mm. The foam had good stability at low temperatures, but if maintained at room temperature it collapsed over 1 hour.

1.2 Gel at 4° C., Whipping at 5° C.

Figure 2:
FIG. 2 shows a 20 wt. % cocoa butter in high oleic sunflower oil foam, prepared as described in example 1, trial 1.2, after 7 days of storage.

The protocol was same as 1.1 above except that the whipping was performed at 5° C. by placing the kitchen mixer in a cold room. A high overrun foam was achieved (200% after 15 minutes whipping). Bubble size distribution was wide, with an average size estimated in the range 0.03-0.05 mm, but with only a very small fraction (less than 5%) of bubbles larger than 0.1 mm. The foam had good stability at low temperatures, but if maintained at room temperature after foaming, the foam showed around 1 cm of drainage after 7 days of storage at room temperature (see FIG. 2). The texture of the foam was much firmer and less prone to flow than that of the gel before whipping.

1.3 Gel Held at 5° C. for 1 Week—Foaming at 5° C.

Figure 3:
FIG. 3 shows a 20 wt. % cocoa butter in high oleic sunflower oil foam, prepared as described in example 1, trial 1.3, after 7 days of storage.

The protocol was the same as 1.1 above, except that 250 g of the mix was stored at 5° C. for 1 week, which allowed for recrystallization. The gel was then whipped at 5° C. for 15 min, 30 min and 45 min. A high overrun foam was achieved (180% after 15 minutes whipping and 235% after 30 minutes whipping). Average bubble size was smaller than in the earlier trials, estimated to be 0.03-0.05 mm, leading to very white appearance of foam. Foam showed a better stability at room temperature, i.e. it could be stored for weeks without apparent macroscopic collapse, and with very limited drainage (below 1 mm of drainage after 7 days of storage) (see FIG. 3).

1.4 Gel Held at 5° C. for 1 Week—Foaming at 20° C.

The protocol was the same as in 1.3 above except that whipping was performed at 20° C. A high overrun foam was achieved (225% after 15 minutes). Stability and bubble size was similar to 1.3.

1.5. Gel Held at 5° C. for 2 Weeks—Foaming at 5° C.

The protocol was same as in 1.3 except the gel storage duration which was 2 weeks. The stability and bubble size was similar to 1.3.

Summary of Results Foaming 20% Cocoa Butter in High Oleic Sunflower Oil:

| Conditions | Max overrun |
| --- | --- |
| Gel 4° C. - Foamed at 20° C. | 243% |
| Gel 4° C. - Foamed at 5° C. | 245% |
| Gel held at 5° C. for 1 week. Foamed at 5° C. | 235% |
| Gel held at 5° C. for 2 weeks. Foamed at 5° C. | 200% |
| Gel held at 5° C. for 1 week. Foamed at room temperature | 226% |

Example 2: Foams with Cocoa Butter in High Oleic Sunflower Oil with Addition of Maltodextrin Particles Mix preparation: 20 wt. % cocoa butter, 10 wt. % maltodextrin particles (DE11-14) in HOSFO was heated to 70° C. until complete dissolution of the cocoa butter. 250 g of the mix placed in a closed vial. The vial was placed in water, cooled within a double-jacketed container (cooling water at 4° C.) for 20 hours. The gel obtained was stored at 5° C. for 1 week before being placed in a Hobart kitchen mixer at 5°

C. fitted with a balloon whisk and whipped at speed 2 for 15 min, 30 min and 45 min. The resulting foam was compared with trial 1.3 above which had the same conditions apart from no maltodextrin particles. The foam with maltodextrin particles has a maximum overrun of 214% (compared to 235% for the sample with no particles). However, the trial with maltodextrin had improved stability against coarsening over time and showed better homogeneity of the foam.

Example 3: Foaming of Other Glycerides in High Oleic Sunflower Oil

A series of other glycerides were prepared at 20 wt. % (except where stated) in high oleic sunflower oil, being completely melted and then cooled to a gel at 4° C. The samples were whipped as in example 1.

| Glyceride | Conditions | Max overrun & comments |
| --- | --- | --- |
| Refined hydrogenated coconut oil, Mpt. 38° C. (Peerless Foods, Australia) | Gel stored at 15° C. for 15 h, then at 5° C. for 1 h. Whipped at 5° C. | 187% Poor storage at 20° C., but good at 5° C. |
| Hydrogenated palm kernel oil, Mpt. 45° C. (Lam Soon, Thailand) | Gel stored at 15° C. for 15 h, then at 5° C. for 2 h. Whipped at 5° C. | 177% Stable at 20° C. without drainage after 7 days but with some contraction |
| Cocoa Butter equivalent, Mpt. 45° C. (Loders Croklaan) | Gel stored at 15° C. for 15 h, then at 5° C. for 20 h. Whipped at 5° C. | 264% Stable at 20° C. without drainage after 7 days |
| High melting palm fraction, Mpt. 60° C. (AAK Sweden) | Gel stored at 20° C. for 16 h, then at 5° C. for 1 h. Whipped at 5° C. | 141% Stable at 20° C. without drainage after 7 days |
| Interesterified cocoa butter, Mpt. 52° C. (Cargill) | Gel stored at 5° C. for 5 h, then at 5° C. for 1 h. Whipped at 5° C. | 75% 1 cm drainage after 7 days at 20° C. |
| Mono and di-glyceride mixture, MPt. 67° C. (mono-di HR 40 Grindsted ® - Danisco) | (at 15% in HOSFO) Gel stored at 5° C. for 20 h Whipped at 5° C. | 136% |
| Lactic acid ester of monodiglycerides, Mpt. 42° C. (Gringsted ® Lactem P22 - Danisco) | Gel stored at 20° C. for 20 h Whipped at 20° C. | 140% |
| Acetic acid ester of monoglycerides, Mpt. 40° C. (Gringsted ® Lactem P22 - Danisco) | Gel stored at 20° C. for 20 h Whipped at 20° C. | 97% |

Example 4: Comparative Examples

The same process used to foam compositions comprising glycerides was applied to non-glyceride molecules; trans-resveratrol (3,5,4'-trihydroxy-trans-stilbene) a natural stilbenoid, sterol esters (fatty acids esterified onto a sterol rather than a glycerol backbone) and sugar esters (fatty acids esterified onto sugars rather than a glycerol backbone).

Trans-resveratrol (Evolva™) melting point 260° C., was mixed with high oleic sunflower oil at 10% and heated to 90° C. The mixture was cooled to 4° C. and a gel formed. After 20 hours storage at 5° C. the mixture was whipped at 5° C. No foaming was observed, even after 45 minutes whipping.

Sterol esters (Vitasterol S-80 from VitaeNaturals), melting point 45° C., were mixed with high oleic sunflower oil at 10% and heated to 60° C. for complete melting. The mixture was cooled to 4° C. and a gel formed. After 20 hours storage at 5° C. the mixture was whipped at 20° C. No foaming was observed (overrun less than 7%), even after 45 minutes whipping.

Sugar esters (Ryoto Sugar Ester S-570 from Mitsubishi Chemical), melting point 65° C., were mixed with high oleic sunflower oil at 10% and heated to 85° C. for complete melting. The mixture was cooled for 15 hours at 15° C. followed by 1 hour at 5° C. and a gel formed. After 1 hour storage at 40° C. the mixture was whipped at 40° C. No foaming was observed even after 45 minutes whipping. Going to lower temperatures increased sample heterogeneity.

Example 5: Foaming of Single Oil

High stearic sunflower oil stearin (Nutrisun) is a high melting fraction of sunflower oil. Melting point 32° C. (±3° C.).

The high stearic sunflower oil stearin was heated to 90° C. to ensure complete dissolution of crystals. 250 g of the heated solution was placed in a double-jacketed glass container. The mixture was cooled down over 20 hours by applying water at 20° C. to the jacket. The gel obtained was placed in a Hobart kitchen mixer fitted with a balloon whisk at speed 2 for 15 min. High overrun foam was made (max overrun=277% after 45 min whipping). This foam showed good heat stability without apparent macroscopic destabilization and without apparent drainage after 7 days of storage. Bubble size distribution was very wide, with an average size estimated in the range 0.06-0.08 mm, but with only a very small fraction (less than 5%) of bubbles larger than 0.1 mm. This demonstrates that foams may be produced from single fats, the crystals occupying the surface of the gas bubbles necessarily coming from the same fat.

Example 6: Formation of Stable Foams with Monoglyceride in High Oleic Sunflower Oil High Oleic Sunflower Oil (HOSFO) having a melting point of −17° C. (±3)° C. was obtained from SABO Nestrade. Monoglyceride (Dimodan HR) was obtained from Danisco.

Figure 4:
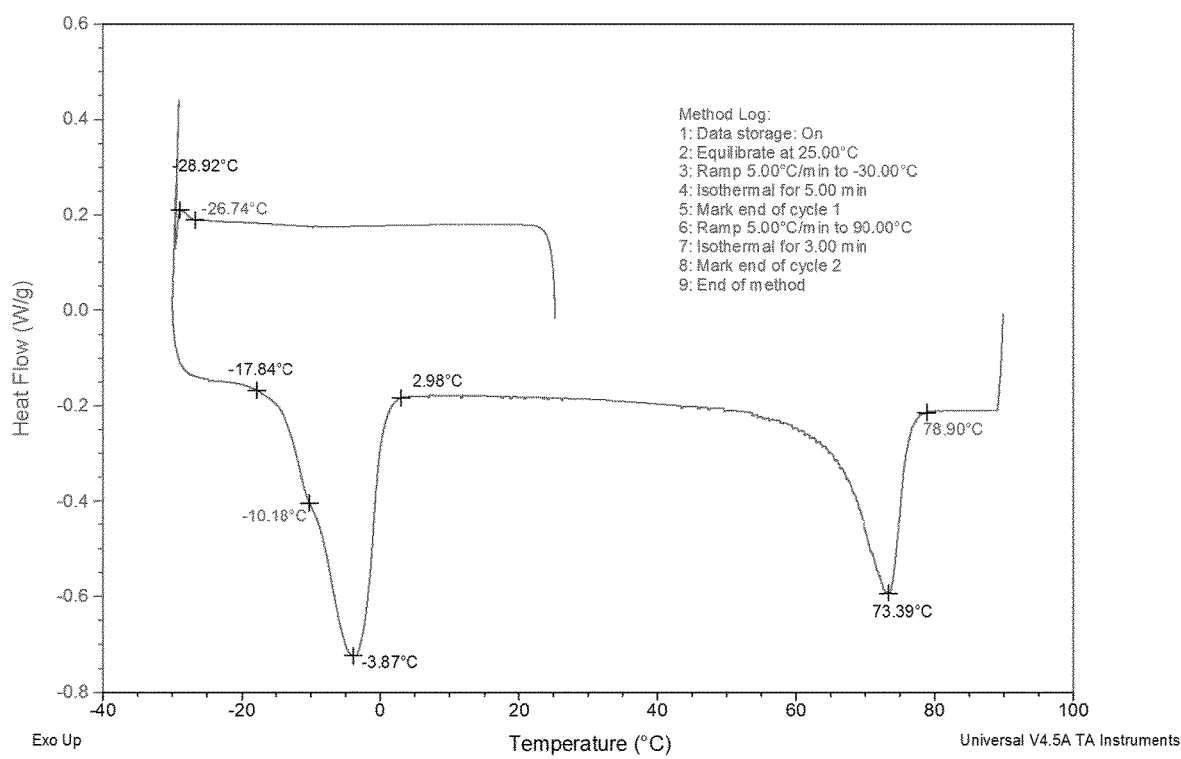
FIG. 4 shows a differential scanning calorimeter crystallization and melting trace for 20 wt. % monoglyceride in high oleic sunflower oil.

The melting and crystallizing profile of 20 wt. % monoglyceride in HOSFO was measured by DSC using a SDT Q600 from TA instruments. The sample was recrystallized at room temperature over an extended period before being cooled to −30° C., it was reheated to 90° C. to record the melting signature. The DSC trace is shown in FIG. 4. It can be seen that the highest melting peak has a peak maximum at about 73° C. and the peak starts at around 60° C. From the DSC reheating trace it can be seen that by 5° C. less than 60% of the lipid remains solid.

Figure 5:
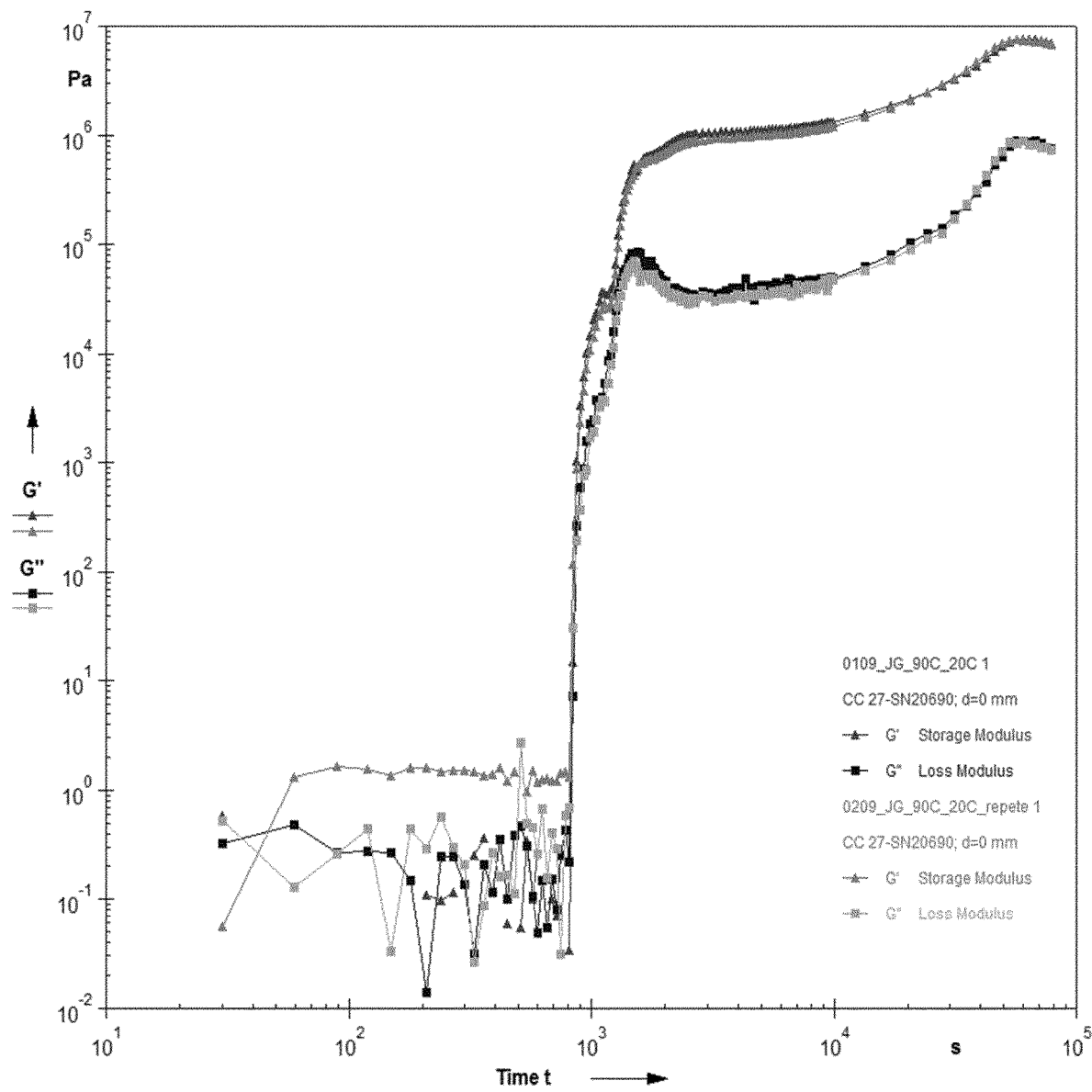
FIG. 5 shows the rheology of the gel forming of 10% Dimodan HR in HOSFO, when cooling from 90° C. to 20° C.

FIG. 5 shows the rheology of the gel forming. Evolution of G' (▲) and G" (■) with time (sec), recorded at 1 Hz, for a 10% Dimodan HR gel in HOSFO, cooling down from 90° C. to 20° C. and stabilizing at 20° C., with a cooling at 2° C./min The strain amplitude was kept at 0.005% to ensure to be in the linear deformation regime. Geometry used was concentric cylinders. Two repeats are shown. It can be seen that after $10^3$ minutes when the gel forms, G' is greater than G" and G' is greater than 10 Pa.

Figure 6:
FIG. 6 shows foamed high stearic sunflower oil stearin stored at 20° C. for 1 day (top image) and 2 weeks (bottom image).

Mix preparation: 10%, 5% and 3% (w/w) mixtures of monoglyceride in HOSFO were heated to 90° C. until complete dissolution. 250 g of the heated solution was placed in a double-jacketed glass container. The mixture was cooled down over 20 hours by applying water at 4° C. to the jacket. The gel obtained was whipped at 4° C. in a Hobart kitchen mixer fitted with a balloon whisk at speed 15 min. The foams generated were stored at 20° C. and are pictured in FIG. 6. The top image shows the foams after 1 day and the bottom image is after 2 weeks. It can be seen that while the samples with 5% and 10% monoglyceride have good stability against drainage, the 3% monoglyceride foam showed some drainage.

Example 7: Influence of Aeration Temperature

Figure 7:
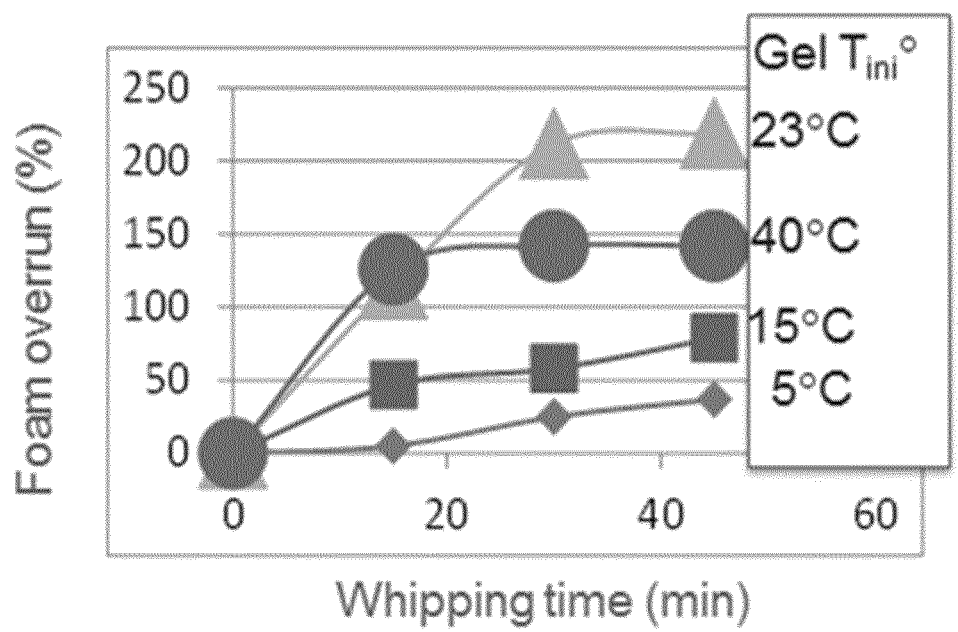
FIG. 7 is a plot of the overrun obtained foaming mixtures of 10% monoglycerides in high oleic sunflower oil at 5° C., 15° C., 23° C. and 40° C.

Mix preparation: Four mixtures of 10% monoglyceride (Dimodan HR) in HOSFO were heated to 90° C. until complete dissolution. Each mixture was transferred to a stainless steel mixing bowl and placed in a freezer at −20° C. for 4 hours. A paste-like gel formed which did not flow under gravity. The four mixtures were then warmed to four different temperatures; 5° C., 15° C., 23° C. and 40° C. and split into three samples before being whipped in a Hobart N50 kitchen mixer. The overrun was measured for each sample after three different whipping durations. The results are shown in FIG. 7. It can be seen that increasing the temperature at which the gel is whipped increases the overrun up to a certain temperature, for this mixture around 20° C., beyond which the overrun is reduced.

Example 8: Bubbles Coated by Crystals

Figure 8:
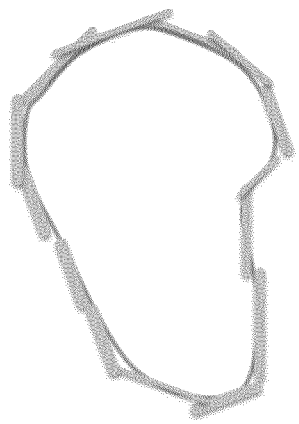
FIG. 8 (right-hand side) shows crystals absorbed at the surface of bubbles in a micrograph of a foam of 10% monoglyceride in high oleic sunflower oil, diluted by a factor of 4. The left-hand side is a diagrammatic representation of how the crystals create a non-relaxing shape.
Figure 8:
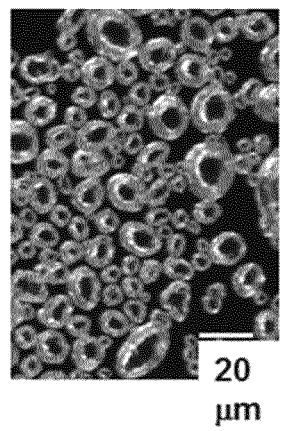
Figure 9:
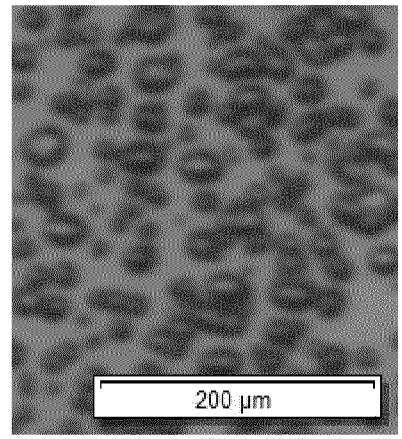
FIG. 9 is a micrograph of the cocoa butter/high oleic sunflower oil foam formed in trial 1.5, diluted with oil.
Figure 10:
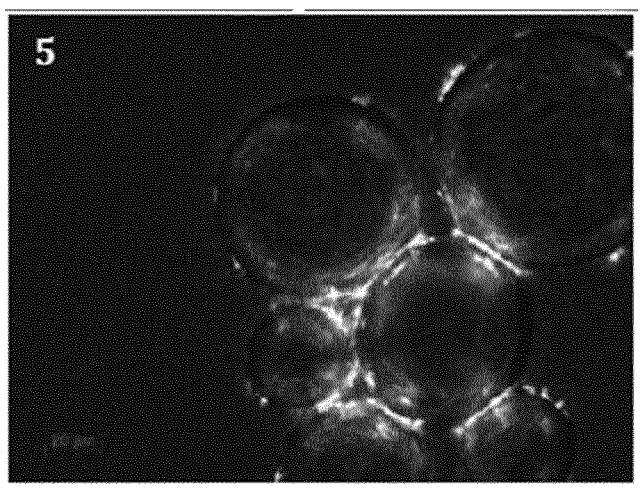
FIG. 10 is a micrograph showing crystals coating the interfaces between bubbles in a monoglyceride/high oleic sunflower oil foam diluted with oil.

FIG. 8 (right-hand side) shows the dense layer of crystals absorbed at the surface of bubbles in a micrograph of a 10% monoglyceride in HOSFO foam, diluted by a factor of 4 with further HOSFO. The image illustrates the type of non-spherical shapes that are found under the microscope, whereby interfacial stabilization by surface adsorption of a dense layer of crystals creates the property of the non-relaxing shape (shown diagrammatically on the left-hand side of FIG. 8). FIG. 9 shows the cocoa butter/high oleic sunflower oil foam formed in trial 1.5 above, diluted with HOSFO. By diluting the foam with liquid oil (e.g. the same liquid oil used for foaming) the bulk rheological effects normally acting on bubble shape are suppressed, but the interfacial stabilization of the crystals around the bubbles can be observed by the fact that the bubble shapes do not relax. From microscopical observations of these foams, around 50% of bubbles were found to have a surface coverage at least 50% of the maximal surface coverage. Maximal surface coverage corresponds to a jammed structure of crystals adsorbed at a bubble's interface, or at the interface between two bubbles. The dense packing of crystals at bubble interfaces gives good stability. FIG. 10 shows crystals coating the interfaces between bubbles in a monoglyceride/HOSFO foam diluted with HOSFO.

Example 9: Impact of Aeration Method

Figure 11:
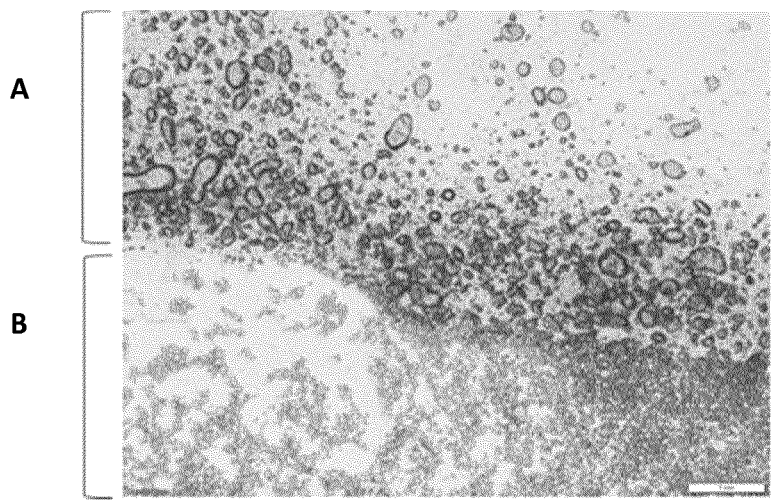
FIG. 11 shows a micrograph of two foams on a single slide, the top foam (A) being a foam resulting from aeration using a pressurized dispenser and the bottom foam (B) being the same type of foam aerated using a pressurized dispenser followed by mechanical whipping.
Figure 12:
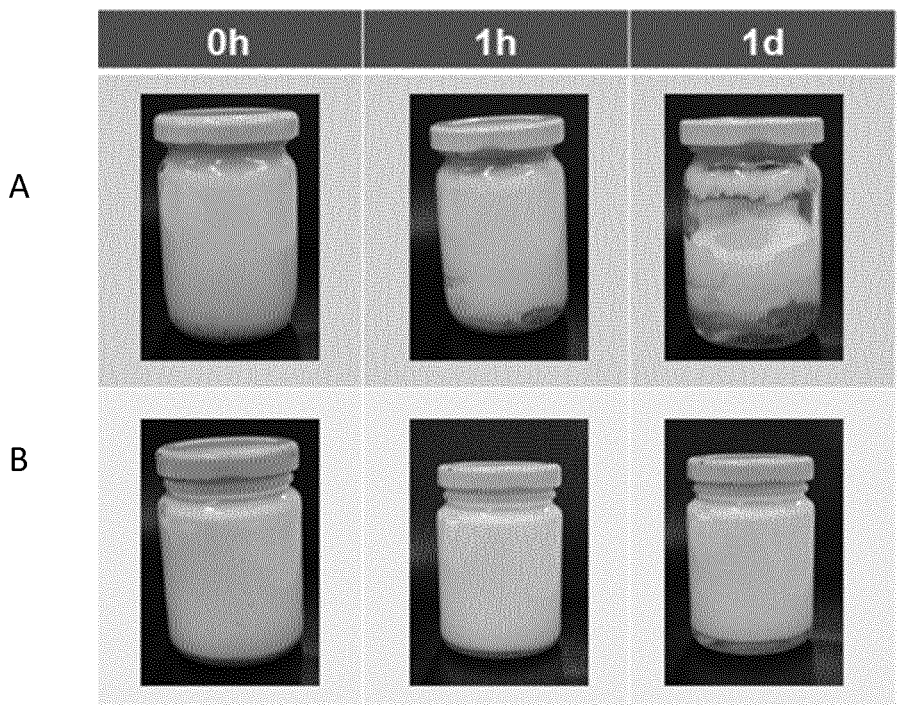
FIG. 12 shows the effect of storage on a foam (A) resulting from aeration using a pressurized dispenser and a foam (B) being the same type of foam but aerated using a pressurized dispenser followed by mechanical whipping.

The impact of aerating a gel using gas dissolved under pressure and then released (gas pressure foaming), was compared to first applying gas pressure foaming and then whipping. FIG. 11 shows two foams on a single microscope slide, the coarse foam which is the result of gas pressure foaming (top), and a fine foam (bottom) which is the result of subsequent gas pressure foaming followed by whipping. 250 g of a 3% Dimodan HR gel in HOSFO was formed by fully melting the mix by heating up to 90° C., placing in a 0.5 L pressurized whipped cream dispenser ("Pattisier" Migros), then leaving the gel to cool down at room temperature until it reached around 30-35° C. The dispenser was pressurized with $N_2O$ and a foam formed at the exit nozzle as the dispenser valve was opened. The foam was then collected and placed in the bowl of the Hobart mixer, then whipped at room temperature at speed 2 for 15 minutes. The resulting foam (B) was compared to a foam (A) that was formed in the same way but without subsequent mechanical whipping. FIG. 12 shows that subsequent whipping of the foam improves the foam quality and stability.

Example 10: Addition of Particles

Figure 13:
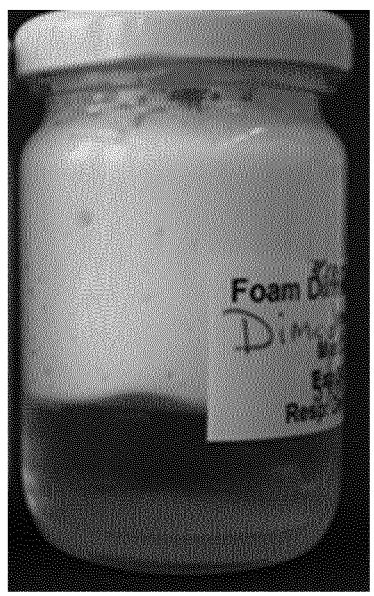
FIG. 13 shows a 3% monoglyeride in high oleic sunflower oil foam after 4 hours, where no particles were added.

This section shows examples that demonstrate the positive effect of particles on the stability against of foams which would otherwise display higher extent of drainage and coarsening. FIG. 13 shows a 3% monoglyerides (Dimodan HR) in HOSFO foam after 4 hours, where no particles were added.

Grinding—sieving protocol for sucrose particles: Sucrose powder (Sigma S-0389) was ground and sieved to obtain 3 different size fractions: a small size range below 100 μm, a medium size range 100 μm-200 μm and a larger size range 200 μm-500 μm.

10.1 Result with the Small Size Range

Figure 14:
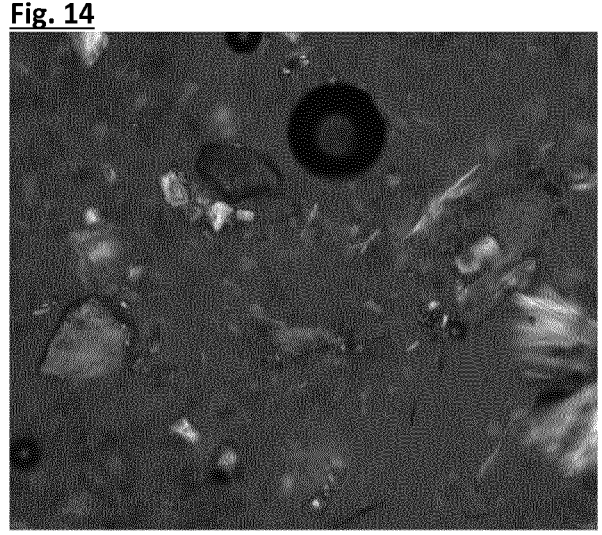
FIG. 14 shows a micrograph of 3% monoglyceride gelled in high oleic sunflower oil in the presence of 10% small size range of sucrose particles.

FIG. 14 shows a micrograph of 3% monoglycerides gelled in HOSFO in the presence of 10% small size range of sucrose particles (S-0389 from Sigma) obtained using the protocol described above.

Figure 15:
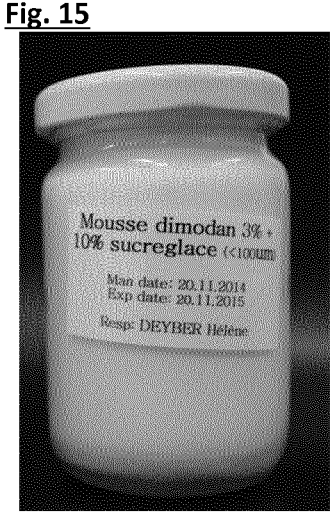
FIG. 15 shows a 4-day old foam made from a gel of 3% monoglyceride in high oleic sunflower oil+10% small size range of sucrose particles.
Figure 16:
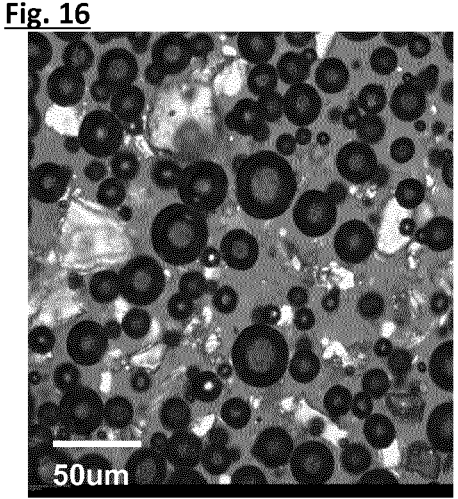
FIG. 16 shows a micrograph of a 4-day old foam made from a gel of 3% monoglyceride in high oleic sunflower oil+10% small size range of sucrose particles after dilution by a factor 3.

FIG. 15 shows a 4 day old foam made from a gel of 3% monoglycerides in HOSFO+10% small size range of sucrose particles (S-0389 from Sigma). The sucrose particles were obtained using the protocol described above. The gel and foam were prepared the usual way as in the absence of sucrose particles. The gel was cooled to 20° C. prior to whipping. FIG. 16 shows a micrograph of the foam after dilution by a factor 3. The foam obtained gave maximal overrun (101%) after whipping 45 min at room temperature.

10.2 Results with the Other Size Ranges

Figure 17:
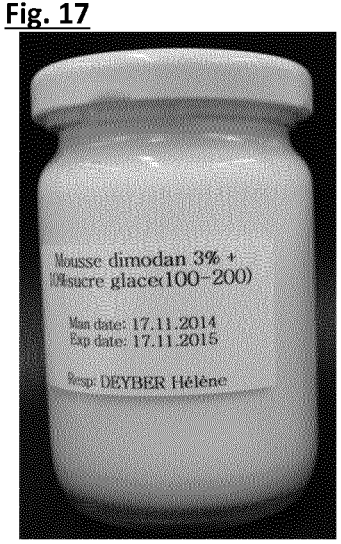
FIG. 17 is a photograph of a foam, older than 4 days, made from a gel of 3% monoglycerides in high oleic sunflower oil in the presence of medium size sucrose particles.
Figure 18:
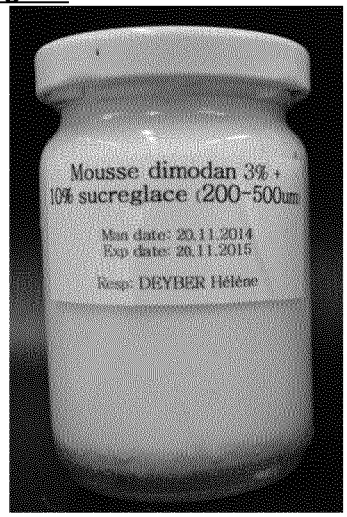
FIG. 18 is a photograph of a foam, older than 4 days, made from a gel of 3% monoglyceride in high oleic sunflower oil in the presence of large size sucrose particles.

FIGS. 17 and 18 show foams, of age more than 4 days, made from 3% monoglycerides in HOSFO gels in the presence of sucrose particles. FIG. 17 is with medium size sucrose particles and FIG. 18 is with large size sucrose particles.

It can be seen that the presence of sucrose particles in all cases have a positive effect on foam stability. Various ranges of particle sizes appear to have a clearly positive effect. The origin of the effect is thought to be the attractive interactions between the polar particles and polar groups of the glycerides.

10.3. Results with Maltodextrin Particles

Hydrophilic type of particles other than sucrose were used, e.g. a maltodextrin powder of dextrose equivalent 6 (DE6). The distribution of particle sizes was large, most of the particles being in volume in the range 0.05-0.4 mm. Again, results on foam stability were pronounced, as shown in FIGS. 19 and 20. FIG. 19 shows a micrograph of a dispersion in oil of maltodextrin DE6 particles. FIG. 20 shows a foam of age more than 4 days, made from 3% monoglycerides in HOSFO gels in the presence of maltodextrin DE6 particles.

The resulting foam had an overrun around 100%, and displayed higher stability than the equivalent foam with no added particles.

Example 11: Aerated Chocolate Filling

Two chocolate fillings were then prepared, one with high oleic sunflower oil (HOSFO), monoglycerides and chocolate, and the second with hazelnut oil, monoglycerides and chocolate.

440 g of 10 wt. % monoglyceride (Dimodan HR—Danisco) in high oleic sunflower oil (EULIP) was heated to 85° C., then cooled to 10° C. in a freezer (internal temperature−18° C.). Once 10° C. was reached the mixture was removed from the freezer. 880 g of commercial milk chocolate (at 25° C.) was then added. The mixture was then heated to 35° C. to create a homogeneous viscous liquid, then placed into the freezer for a second time and cooled to 19.6° C. The mixture was then whipped with a Hobart mixer on speed setting 2 at 20±1° C. for 20 minutes. After 20 minutes of whipping the overrun was found to be approximately 26%.

For the second filling, 200 g of 10 wt. % monoglyceride in hazelnut oil (AAK) was heated to 85° C., then cooled to 10° C. with the use of a freezer. Once the mixture reached 10° C. it was removed from the freezer. 400 g of chocolate (at 25° C.) was then added. The mixture was then heated to 35° C. to create a homogeneous viscous liquid. The sample was then placed into the freezer for a second time and cooled to 20.3° C. The mixture, at 20° C., was then whipped with a Hobart mixer on speed setting 2 at 20±1° C. for 20 minutes. After whipping for 20 minutes the sample had an overrun of approximately 26%. This value was almost the same as that obtained with the use of HOSFO indicating that the oil type did not affect the overrun obtained.

The aerated fat-based confectionery material produced with both oils was then filled into chocolate shells and backed-off with a final layer of chocolate to complete the filled chocolate confectionery product.

Example 12: Extruded Cereal Product with Aerated Filling 200 g of 10 wt. % monoglyceride in peanut oil (IFF) was heated to 90° C. 25 g cocoa powder, 200 g white sugar (0.01-0.015 mm particle size), 25 g peanut flour dark roast (Golden peanut company) and 25 g caramelised milk powder (Dr. Suwelack) was then added to the oil and monoglyceride. Once the additional materials were added the mixture was not homogeneous, therefore, the sample was reheated to 60° C. (from 50° C.) to create homogeneity, and then added to the freezer. The mixture was removed from the freezer once it had reached 19.8° C. and whipped with a Hobart mixer on speed setting 2 at 20° C. for 60 minutes. After 60 minutes of whipping the overrun reached approximately 47%.

The aerated fat-based confectionery material was then filled into chocolate-flavoured extruded cereal tubes with the use of a piping bag. The average weight of the cereal tubes was 1±0.1 g. The average amount of the peanut oil based filling added to the cereal tubes was 0.7±0.05 g.

Example 13: Biscuit Filling

An aerated biscuit filling with a vanilla flavour was produced. 200 g of 10 wt. % monoglyceride in HOSO was heated to 90° C., then 200 g white sugar, 150 g skimmed milk powder and 0.5 g crystallised vanilla was added. The sample formed a homogenous paste at 45° C. (when the sugar, milk powder and vanilla were added). Therefore, the mixture was added to the freezer without any additional heating. The sample was then removed from the freezer at 18.7° C. and whipped with a Hobart mixer on speed setting 2 at 20±1° C. for 20 minutes. The overrun of the mixture was 32% after 15 minutes. The aerated fat-based confectionery material was then placed between two sandwich biscuits. It was found that the whereas the standard filling for that biscuit size had a filling of 3 g, the whipped vanilla filling achieved the same appearance and size with only 2.5±0.2 g.

Example 14: Foamed Ice-Cream Coating with Monoglycerides 450 g high oleic sunflower oil and 50 g Dimodan HR (Danisco) were weighed into a 1 L bottle and heated to 90° C. with stirring until fully dissolved. The mixture was transferred to a stainless steel mixing bowl and placed in a freezer (−20 to −25° C.), until a paste-like gel had formed that did not flow under gravity (approximately 4 hours). The bowl containing the gel was removed from the freezer and allowed to warm up to 20° C. The gel was then whipped using a Hobart mixer with balloon whisk attachment at speed 2 until a foam formed (up to 40 min). The overrun was around 200%.

An ice-cream coating pre-mix with a fat content of 37.7% was prepared, having the following composition:

|  | % |
|---|---|
| Fractionated palm oil | 28.48 |
| Canola oil | 8.51 |
| Sugar | 40.16 |
| Cocoa powder (10-12% fat) | 8.77 |
| Partially demineralized whey powder | 13.18 |
| Soy lecithin | 0.85 |
| Vanillin | 0.03 |

The coating pre-mix was melted in an oven at 40° C. for 2-3 hours and then stirred to homogenize. At 20° C., the pre-mix and foam were combined to form aerated ice-cream coatings at different ratios; 10 wt. % foam+90 wt. % pre-mix, 30 wt. % foam+70 wt. % pre-mix, and 50 wt. % foam+50 wt. % pre-mix. The mixtures were gently combined with a rubber spatula to obtain an even aerated coating mix similar in appearance to a "chocolate mousse"

Figure 22:
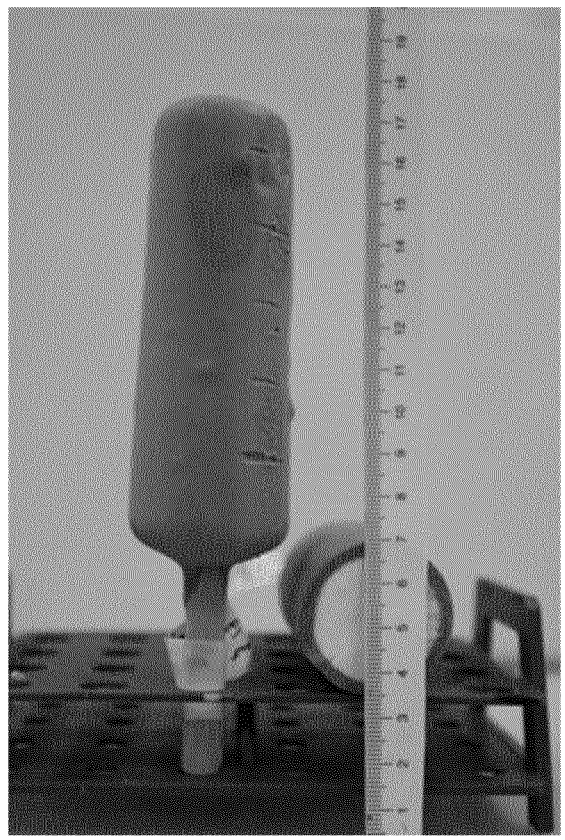
FIG. 22 is a photograph of a coated ice cream prepared by the process of Example 14.

Molded ice cream centres supported on a stick were manufactured and maintained at −25° C. The different ice-cream coatings were placed in beakers and warmed to 35° C. Ice-cream centres were dipped into each coating so as to cover the surface of the ice-cream. The coated ice-cream was then transferred to the freezer at −25° C., suspended by its stick and allowed to harden. An ice-cream prepared by this process is shown in FIG. 22.

The overruns obtained were as follows:

|  | Before coating | After coating |
|---|---|---|
| 10 wt. % foam + 90 wt. % pre-mix | 16 | 15 |
| 30 wt. % foam + 70 wt. % pre-mix | 50 | 49 |
| 50 wt. % foam + 50 wt. % pre-mix. | 76 | 75 |

It can be seen that the foam was very stable during the coating (dipping) process.

The ice-cream coating can alternatively be prepared by combining the pre-mix with the high oleic sunflower oil and monoglyceride mixture before whipping.

450 g high oleic sunflower oil and 50 g Dimodan HR (Danisco) were weighed into a 1 L bottle and heated to 80° C. with stirring until fully dissolved. The mixture was transferred to a stainless steel mixing bowl and let at rest to cool down until a paste-like gel had formed that did not flow under gravity (approximately 10 hours/overnight).

350 g of the ice-cream coating pre-mix with a fat content of 37.7% was melted in an oven at 40° C. for 2-3 hours and then stirred to homogenize.

150 g of the gel was then added to the premix and the mixture gently homogenized.

The mixture was the whipped using a Hobart mixer with balloon whisk attachment at speed 2 until a foam formed (up to 20 min). The overrun was around 51%.

Molded ice cream centres supported on a stick were manufactured and maintained at −25° C. The ice-cream coating was placed in a 600 mL beaker filled up to 500 mL. 10 ice-cream centres were dipped into coating so as to cover the surface of the ice-cream. The coated ice-cream was then transferred to the freezer at −25° C., suspended by its stick and allowed to harden.

The overrun of the aerated coating remaining in the beaker was around 49%.

Figure 23:
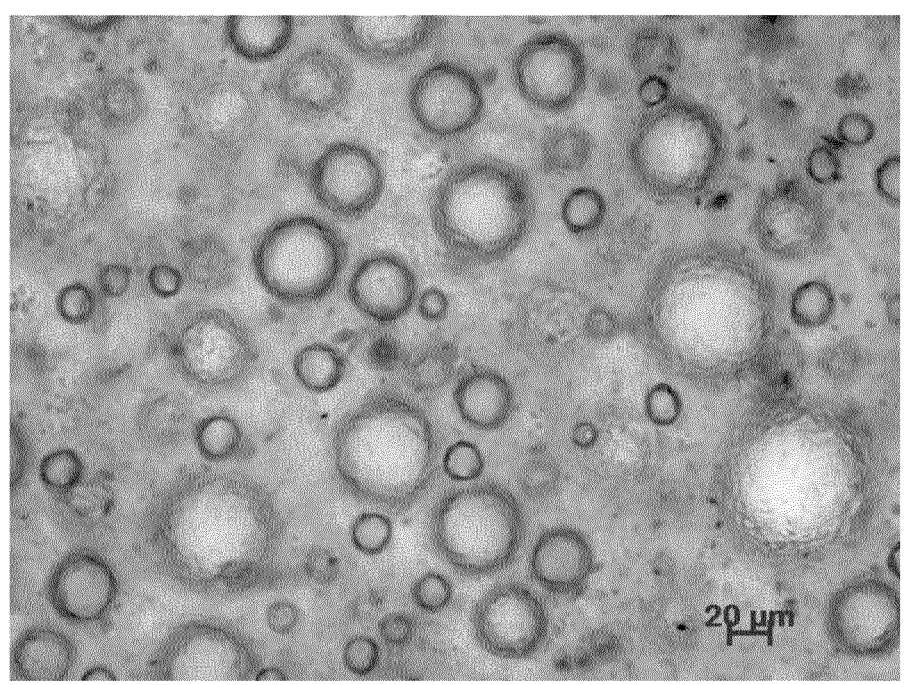
FIG. 23 shows an optical micrograph of an aerated ice-cream coating from Example 14 just after whipping.

FIG. 23 shows an optical micrograph of the obtained aerated ice-cream coating just after whipping.

Figure 24:
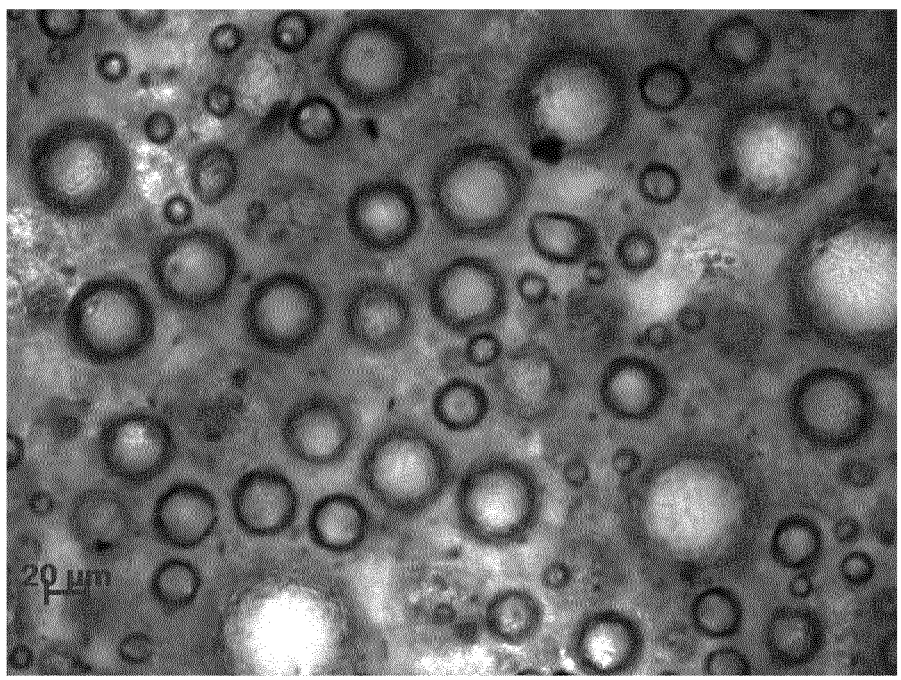
FIG. 24 shows an optical micrograph of the aerated ice-cream coating remaining in the beaker after coating 10 ice-creams in Example 14.

FIG. 24 shows an optical micrograph of the aerated ice-cream coating remaining in the beaker after coating of 10 ice-creams showing that the foam has good stability.

Example 15: Foamed Ice-Cream Coating with Triglycerides 400 g high oleic sunflower oil and 100 g of interesterified cocoa butter (Cargill), were weighed into a 1 L bottle and heated to 80° C. with stirring until fully dissolved. The mixture was transferred to a stainless steel mixing bowl and let at rest during 6 days at room temperature then placed at 5° C. for 3 hours until a paste-like gel had formed that did not flow under gravity. The gel was then whipped using a Hobart mixer with balloon whisk attachment at speed 2 at 5° C. until soft white foam formed (up to 30 min).

350 g of the ice-cream premix with fat content of 37.7% was prepared and melted in an oven at 35° C. for 2-3 hours and then stirred to homogenize.

At 20° C., the pre-mix and 150 g of foam were combined to form an aerated ice-cream coating. The mixture was gently combined with a rubber spatula to obtain an even aerated coating mix similar in appearance to a "chocolate mousse"

The same protocol was applied for Cocoa Butter equivalent (Loders Croklaan) and Shea butter (AAK).

The overruns obtained were as follows:

|  | White foam | Aerated coating |
|---|---|---|
| Interesterified Cocoa Butter | 82 | 31 |
| Cocoa Butter equivalent | 211 | 45 |
| Shea butter | 169 | 46 |

Figure 25:
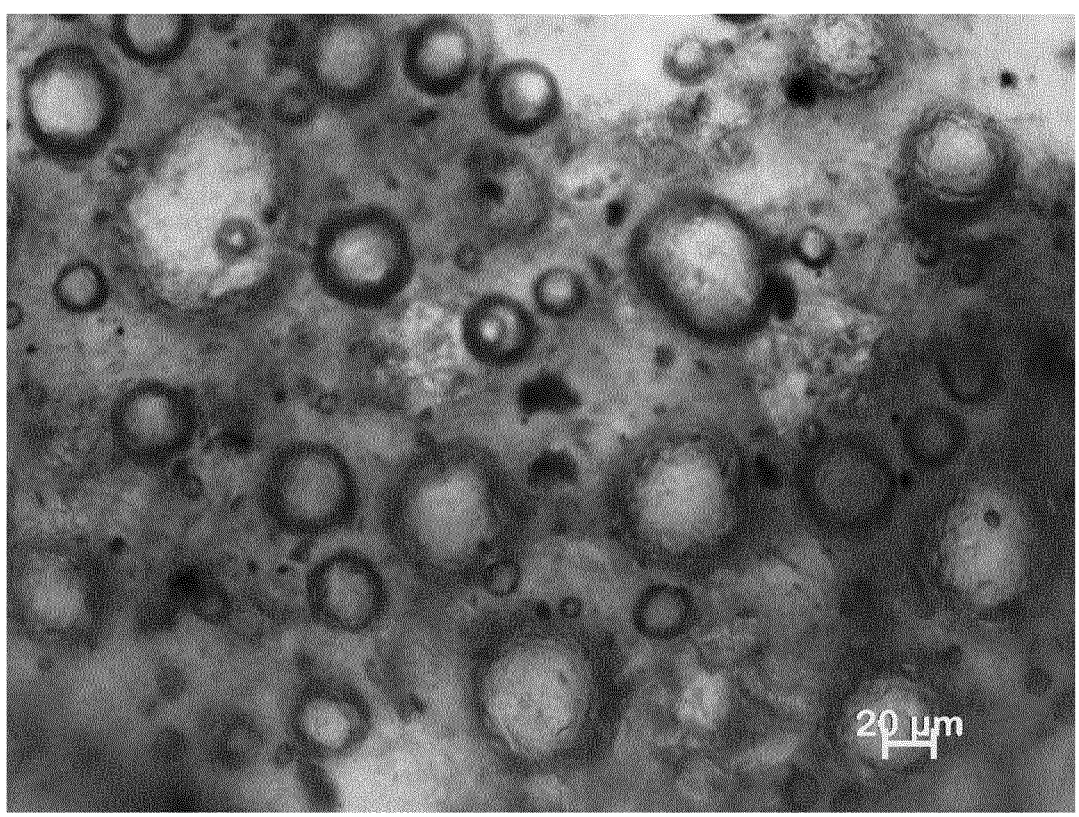
FIG. 25 shows an optical micrograph of an ice-cream coating from Example 15 just after whipping.
Figure 26:
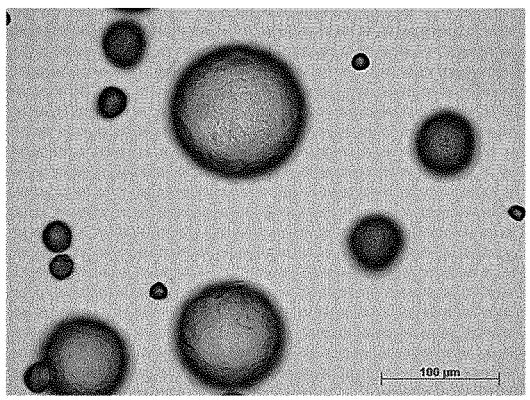
FIG. 26 shows an optical micrograph of a foamed 10% monoglyceride gel, diluted in HOSFO: showing the bubble "poles"

FIG. 25 shows an optical micrograph of the obtained aerated ice-cream coating with interesterified cocoa butter just after whipping.

Example 15: Foams Stabilized by Monoglyceride Crystals—Adsorption Surface Density Estimation Gel Formation:

High oleic sunflower oil (HOSFO) and Dimodan HR monoglycerides were mixed at 80° C. until complete dissolution of the monoglycerides. The mixture was then removed from the hot plate and left to cool overnight at room temperature. The resulting mixture is then an oil gel with a paste-like consistency due to the network formation of the monoglyceride crystals.

Foam Generation:

In a Hobart mixer with balloon whisk, speed 2, during 20 min at room temperature. During whipping, air is incorporated into the gel matrix and form bubbles coated by monoglyceride crystals that ensure long-term mechanical stability to the foam.

Foam Characterization:

OR/porosity: The levels of aeration have been estimated by Over-Run (OR) or porosity ($\phi$) measurements in standardized 3 cL plastic cups.

$$\% \, OR = \frac{m_{non\,aerated} - m_{aerated}}{m_{aerated}} \times 100$$

$$\% \, \phi = \frac{OR}{OR + 100} \times 100$$

Bubble size: After dilution in HOSFO, a few drops of each aerated samples were placed onto a glass slide and then imaged using appropriate magnification and brightfield illumination using a Zeiss optical microscope. The diameters of more than 100 bubbles were then measured to estimate the Sauter mean diameter D[3;2].

$$D[3;2] = \frac{\Sigma D_i^3}{\Sigma D_i^2}$$

Foam Dilution and Subnatant Sampling:

Foams were diluted 5 times by HOSFO addition and gentle manual stirring until full homogenization. The samples were left at rest to cream 4 hours until phase separation occurred between an upper layer formed by bubble accumulation, due to buoyancy mismatch between air and the continuous oil phase, and a bottom phase formed by HOSFO and the remaining non-adsorbed monoglyceride crystals. The upper foam layers were then carefully removed with spoon and the subnatants were collected for analysis.

MAG Titration:

Monoglyceride titrations were performed using gas chromatography. Limit of quantification: 0.05 g/100 g.

Foam Characterization and Analytical Results:

3 foams have been prepared based on gels at different monoglyceride concentrations. Overruns, porosities and bubble size values are summarized in the table below.

| Foam sample | Composition of the initial gel | OR % | ø % | D[3; 2] μm |
|---|---|---|---|---|
| 1 | 5% monoglyceride gel | 125 | 55.6 | 57.7 |
| 2 | 10% monoglyceride gel | 186 | 65.0 | 53.6 |
| 3 | 20% monoglyceride gel | 171 | 63.1 | 48.2 |

After dilution of the foams, 3 subnatant samples plus 1 pure HOSFO sample have been prepared and analysed by titration. The results of the monoglyceride (MAG) titration are shown below.

| Foam sample | Composition of the initial gel | Dilution factor (X) before sampling | MAG concentration in diluted subnatant g/100 g |
|---|---|---|---|
| 0 | pure HOSFO | 0 | 0.06 |
| 1 | 5% monoglyceride | 5 | 0.24 |
| 2 | 10% monoglyceride | 5 | 0.54 |
| 3 | 20% monoglyceride | 5 | 2.54 |

Calculation Information:
Interfacial Area (S) Developed by a Foam:

$$S = \frac{6\phi V}{D}$$

V: volume of foam (m$^3$)
$\phi$: porosity
D: bubble Sauter diameter (m) as measured by optical microscopy/tomography
Concentration of Adsorbed Monoglyceride at Interface:

$$c_{ads} = c_{ini} - c_{non-ads} \times X$$

$C_{ads}$: Monoglyceride concentration, relative to the oil phase, adsorbed at the air-oil interface of the bubbles
$C_{ini}$: initial concentration of monoglyceride in the gel
$C_{non-ads}$: non-adsorbed crystal concentration as titrated from the diluted subnatant
X: dilution factor applied to the foam before collecting the subnatant
Adsorption Surface Density:

$$\Gamma = \frac{c_{ads}(1 - \phi)V}{S}$$

Adsorption Surface Density Estimations:

| Foam sample | Composition of the initial gel | OR % | ø % | D[3; 2] μm | Γ mg·m$^{-2}$ |
|---|---|---|---|---|---|
| 1 | 5% monoglyceride | 125 | 55.6 | 57.7 | 234 |
| 2 | 10% monoglyceride | 186 | 65.0 | 53.6 | 303 |
| 3 | 20% monoglyceride | 171 | 63.1 | 48.2 | 306 |

Conclusion:
The adsorption surface density needed to stabilize a foam with monoglycerides is quite constant no matter the initial monoglyceride concentration in the gel.

From these values, coupled with the monoglyceride structure and size/shape we can theoretically estimate the surface coverage %. If we assume that monoglyceride crystals are pure and are forming a uniformly continuous and complete layer wrapping the bubbles (which is consistent with the micrographs) and if we approximate the monoglyceride crystal density at 0.9 g/cm$^3$, the minimal layer thickness will be around 300 nm.

Figure 27:
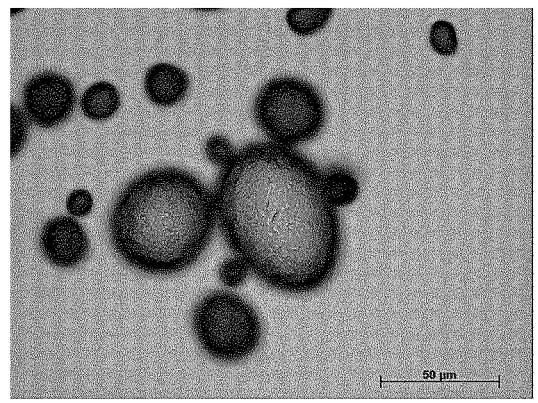
FIG. 27 as FIG. 26, but showing non-spherical bubbles
Figure 28:
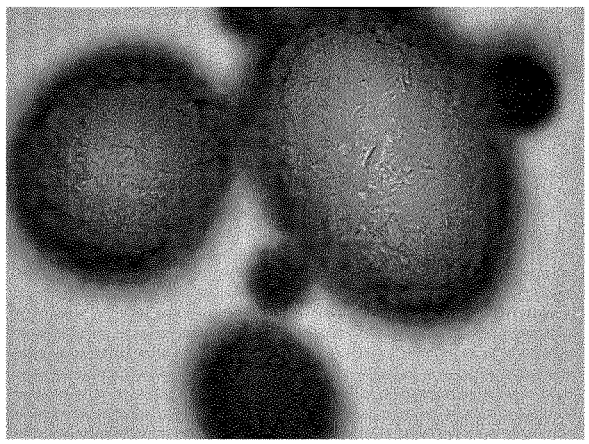
FIG. 28 is a zoom of the same image as FIG. 27
Figure 29:
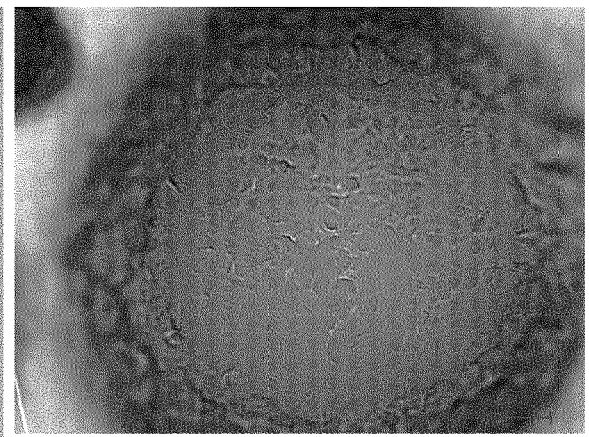
FIG. 29 is a higher magnification image of the same sample as FIG. 26 (scale bar 20 µm)
Figure 30:
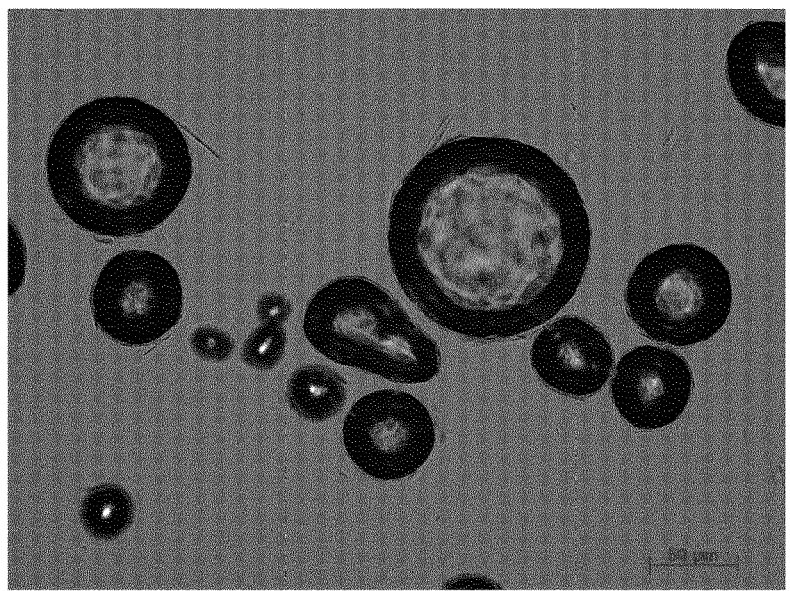
FIG. 30 shows an optical micrograph of a foamed 10% Dimodan HR gel, diluted in HOSFO: showing the bubble "equatorial" plan
Figure 31:
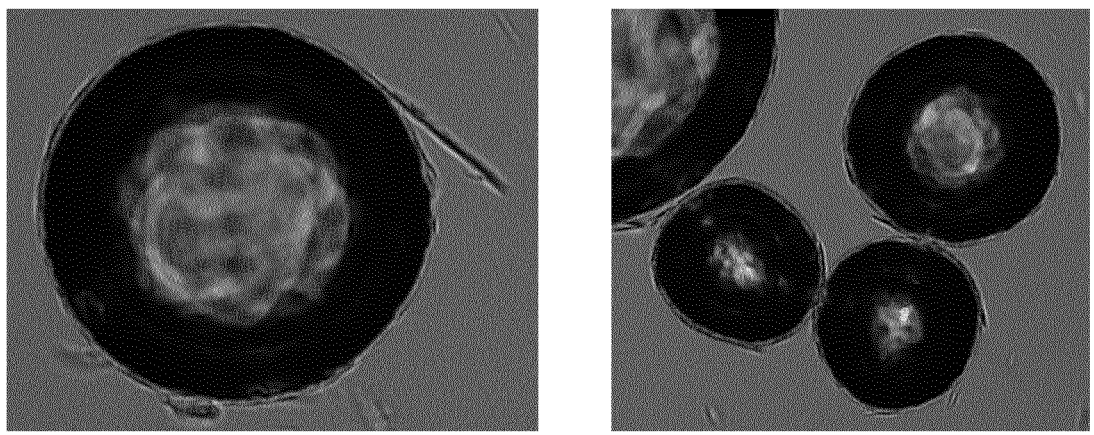
FIG. 31 is a zoom of the same image as FIG. 30

Example 16: Foams Stabilized by Monoglyceride Crystals—Visualization of the Adsorbed Monoglyceride Crystals at Interface by Optical Microscopy A 10% monoglyceride foam was prepared and imaged using an optical microscope as described in Example 15. Images of the bubble "poles" (FIGS. 26-29) clearly shows a complete layer of crystals adsorbed at the air/oil interface and forming a crust wrapping the bubbles. With such a high level of surface coverage it is immediately obvious after inspection by microscopy that at least 50% of the surface of the gas bubbles is occupied by crystals. Non spherical bubbles, as can be seen in FIGS. 27 and 28, are typical of a complete coverage of the bubble surface by jammed crystals arresting the spontaneous shape relaxation that should lead to a spherical shape. Images showing the bubble "equatorial plan" (FIGS. 30-31) show a thin layer of crystals adsorbed all around the bubbles, indicating a full and homogeneous surface coverage.

Example 17: Foaming of Ice-Cream Coatings—Formation of Glyceride Crystals Required for Foam Formation Ice-Cream Coating Recipes:
Two recipes were prepared. For the recipe 2, monoglycerides (Dimodan HR) were dissolved in the coating recipe heated at 80° C. under stirring and then the full recipe left to cool down to room temperature overnight. Before aeration experiments, coatings have been melted at 35° C. during 4 hours. Composition of the two recipes are described in the table below.

| Ingredients | Recipe 1 wt % | Recipe 2 wt % |
|---|---|---|
| Coconut oil | 58.6 | 56.6 |
| Dimodan HR | 0.0 | 2.0 |
| Sugar | 28.4 | 28.4 |
| Skimmed milk | 4.0 | 4.0 |
| Lecithin | 0.5 | 0.5 |
| Cocoa powder | 8.5 | 8.5 |

Figure 32:
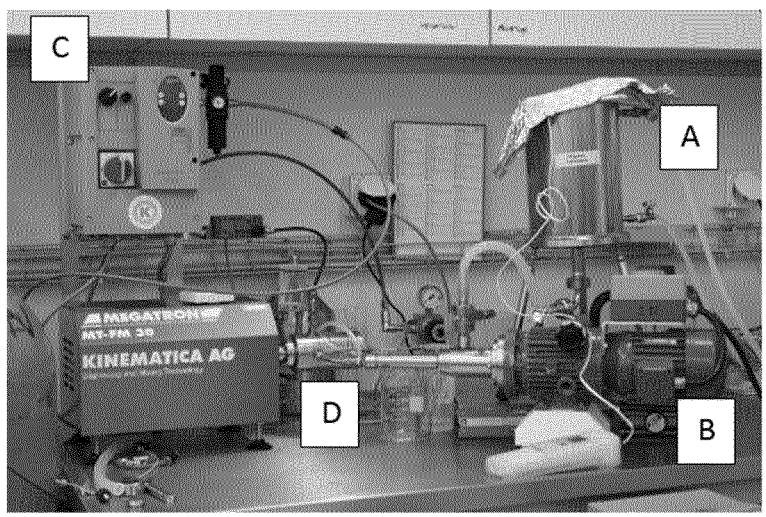
FIG. 32 shows the Megatron aeration system used in Example 17, with (A) double-jacket reservoir, (B) screw pump, (C) control unit, (D) aeration chamber.

Aeration:
by batch: Ice-cream coatings (ICC) were aerated using a Hobart mixer with a balloon whisk for 20 minutes on speed 2 at 25° C.
in-line: a Megatron MT-FM30 (Kinematica AG) aeration unit coupled with an IKA screw pump (see FIG. 32) was used to mimic an industrial aeration system. Typical settings were as follows:
Double-jacket reservoir (A) with a temperature set at 25° C.
Screw pump (B) with a flow output set at 20-25 mL/min
Gas injection: N2 pressure=5 bars
N$_2$ flow during aeration: 20 ml/min
Rotor speed in the aeration chamber (D): 1500 RPM
Temperature of the aeration chamber controlled by thermostatic bath: 16° C. or 20° C.

Foam Characterization:

OR/porosity: The levels of aeration have been estimated by Over-Run (OR) or porosity ($\phi$) measurements in standardized 3 cL plastic cups.

$$\% \, OR = \frac{m_{non\,aerated} - m_{aerated}}{m_{aerated}} \times 100$$

$$\% \, \phi = \frac{OR}{OR + 100} \times 100$$

Figure 33:
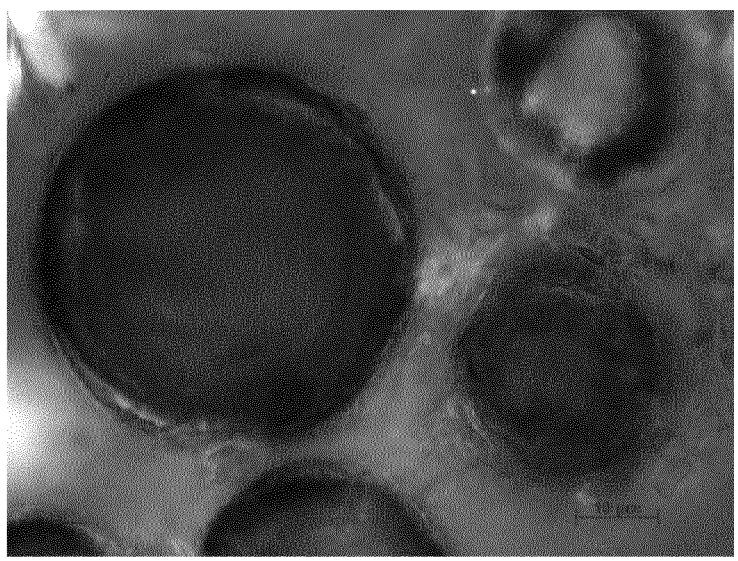
FIG. 33 shows a micrograph of an ice-cream coating containing monoglycerides and foamed using a Megatron aeration system.

Optical microscopy: After dilution in HOSFO, a few drops of each aerated sample were placed onto a glass slide and then imaged using appropriate magnification and brightfield illumination using a Zeiss optical microscope. The presence or absence of gas bubbles having at least 50% of their surface occupied by crystals was noted. An typical image from Exp 4 Recipe 2 is shown in FIG. 33.

Experiments:

The two recipes have been aerated with a Hobart or with a Megatron. In this latter case the temperature in the aeration chamber has been varied (20° C. or 16° C.). The results are summarized in the table below.

| Exp. # | Recipe # | Aeration process | Temperatures (° C.) | | | OR % | $\phi$ % | Crystal-coated bubbles observed? |
|---|---|---|---|---|---|---|---|---|
| | | | whipping | inlet | aeration unit | | | |
| 1 | 1 | Hobart | 25 | — | — | 0 | 0 | No |
| 2 | 2 | Hobart | 25 | — | — | 35 | 26 | Yes |
| 3 | 1 | Megatron | — | 25 | 20 | 6 | 6 | No |
| 4 | 2 | Megatron | — | 25 | 20 | 116 | 54 | Yes |
| 5 | 1 | Megatron | — | 25 | 16 | 160 | 62 | Yes |

Figure 34:
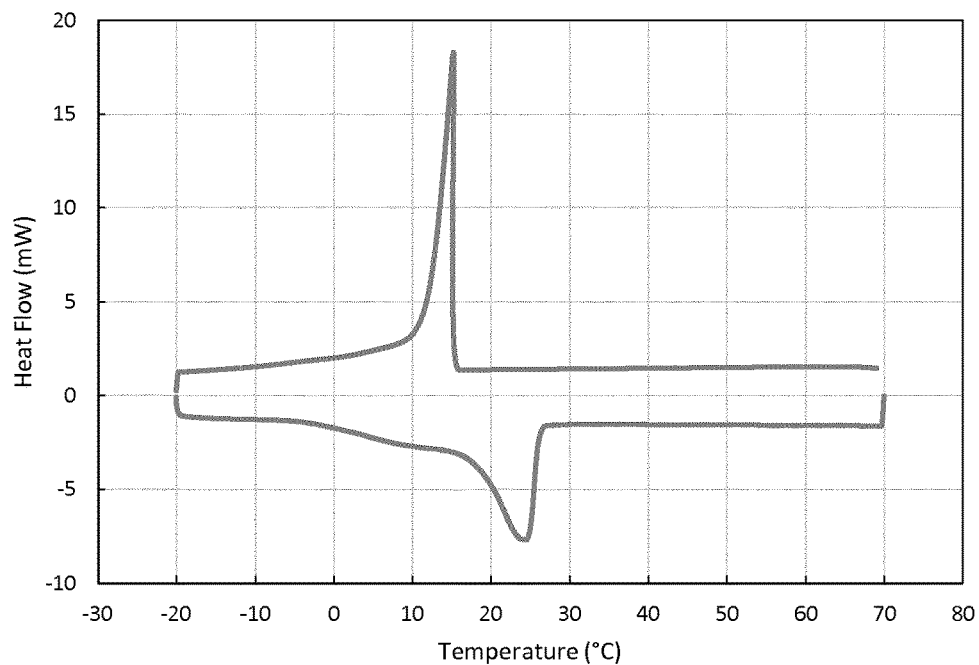
FIG. 34 shows a differential scanning calorimeter scan of the ice-cream coating material of Example 17

Conclusion:

The ice-cream coating material required the addition of monoglycerides in order to form solid lipid (glyceride crystals) when cooled to 20° C. or 25° C. Having solid lipid present, the material was able to be foamed by batch or in-line process, and crystal-coated bubbles were observed at the air/oil interface in the resulting foam by microscopy. Without the presence of monoglycerides it was still possible to generate a foam, but the temperature of the aeration unit had to be reduced to 16° C. At this temperature solid lipid (glyceride crystals) will be present, as can be observed from a Differential Scanning calorimeter trace of the ice-cream coating material (FIG. 34). Crystal-coated bubbles could also be observed at the air/oil interface in the resulting foam by microscopy.

Crystallization and melting temperatures were measured by Differential Scanning calorimetry (TA Instrument Q2000). Samples were prepared in DSC pans & lids in aluminum hermetically sealed. The scanning rate from ambient was 2° C./min. up to 70° C. with an isothermal for 3 min at 70° C. The system was then cooled down at 2° C./min to −20° C. to provoke crystallization. After an isothermal for 3 min at −20° C., a the second heating scan was run with the same scanning rate up to 70° C. to record the melting behaviour.

Example 18: Foams Stabilized by Triglyceride Crystals—Visualization of the Adsorbed Triglyceride Crystals at Interface by Optical Microscopy HOSFO and 10 wt % cocoa butter improver (CBI) were mixed at 60° C. until complete dissolution. The CBI (Illexao HS90-AAK) is based on fractionated shea butter and has a melting point of 43° C.±3° C. The HOSFO/CBI mixture was removed from the hot plate and left to cool overnight at 5° C. The mixture formed a gel with a paste-like consistency. Foam was generated in a Hobart mixer with balloon whisk, speed 2, for 20 min at 5° C. During whipping, air is incorporated into the gel matrix and forms bubbles coated by crystals that ensure long-term mechanical stability to the foam.

Figure 35:
FIG. 35 is a micrograph of a foam consisting of high oleic sunflower oil and cocoa butter improver
Figure 36:
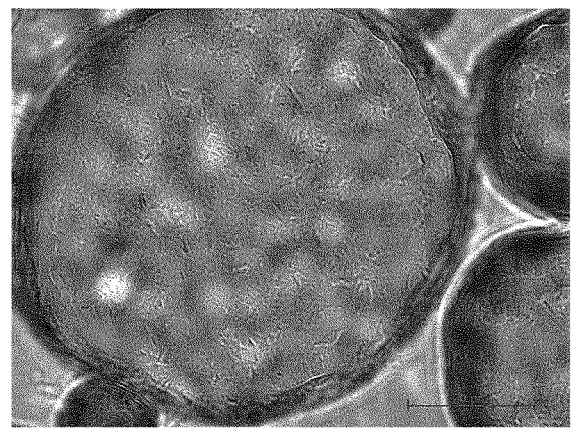
FIG. 36 is a further micrograph of the foam shown in FIG. 35

The samples were examined using optical microscopy. A few drops of the aerated material was placed onto a glass slide and then imaged using appropriate magnification and brightfield illumination using a Zeiss optical microscope. The images (FIGS. 35 and 36) clearly show a complete layer of crystals adsorbed at the air/oil interface and forming a crust wrapping the bubbles.

Example 19: Forming a Milk-Chocolate Based Foam—1-Step Versus 2-Step Process

An aerated milk chocolate was formed using three different glyceride materials to stabilize the oil foam: a CBI as in example 18, a CBE as in example 3 and monoglycerides as in example 6. For the CBI and monoglycerides, a 1-step process was compared with a 2-step process.

Foaming in 1 Step:

10% glyceride material (CBI or monoglycerides) was mixed with 90% oil (high oleic sunflower oil, HOSFO) and heated until no solids remained. This oil mixture was cooled to 20° C. in a water bath, and maintained at that temperature. The oil mixture formed a gel.

A milk chocolate with 34% fat was fully melted and then cooled down to 30° C. The chocolate was tempered by seeding; 0.2% of Chocoseed A (Fuji) was gently mixed in, ensuring no incorporation of air.

The oil mixture (20%) was combined with the chocolate (80%) and whipped in a Hobart mixer, the temperature being maintained at 30° C. The overrun increased up to a whipping time of 1 hour.

Foaming in 2 Steps:

10% glyceride material (CBI, CBE or monoglycerides) was mixed with 90% oil (HOSFO) and heated until no solids remained. This oil mixture was cooled to 20° C. in a water bath, and maintained at that temperature. The oil mixture formed a gel.

A milk chocolate with 34% fat was fully melted and then cooled down to 30° C. The chocolate was tempered by seeding; 0.2% of Chocoseed A (Fuji) was gently mixed in, ensuring no incorporation of air.

The oil mixture was whipped at 20° C. in a Hobart mixer to form a white foam. The white foam was then gently mixed into the chocolate with a spatula.

The porosities obtained are shown below.

| Glyceride | 1-step | 2-step |
|---|---|---|
| Monoglycerides | 0.16 | 0.26 |
| CBI | 0.30 | 0.38 |
| CBE | — | 0.37 |

Figure 37:
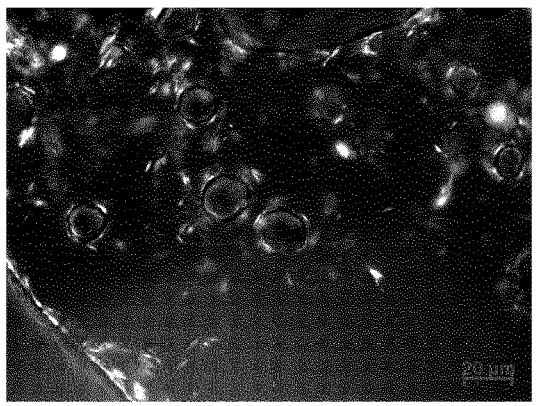
FIG. 37 is a micrograph of a foam containing high oleic sunflower oil and cocoa butter equivalent

The 2-step process, where an aerated gel is mixed with an un-aerated composition, resulted in higher porosities. Crystals surrounding the air bubbles could be observed in all samples by microscopy, for example FIG. 37 which shows the CBE oil foam.

The foams obtained using monoglycerides were examined after 20 days storage. The 1-step foam was found to be darker in colour (indicating a lower air content) and, when disturbed, the 1-step foam collapsed more readily. Microscopical observations of the two foams showed that only a few gas bubbles remained in the 1-step foam, and these were mostly large bubbles. The 2-step foam in contrast had a much greater number of bubbles, the bubbles being smaller in size.

Example 20: Aeration Method Comparison—Pressure Release and Mechanical Whipping

The result of foaming by prolonged whipping using the kitchen mixer was compared to foaming using a gas ($N_2O$) depressurization step. A gel of 5% Dimodan HR in HOSFO was used for these experiments and gas depressurization was achieved using a pressurized whipped cream dispenser as in example 9. The foam created by gas depressurization (named here "ΔP foam") was made from a gel initially at 30° C. The foam created by prolonged whipping of a gel is named here the "whipped foam".

Figure 38:
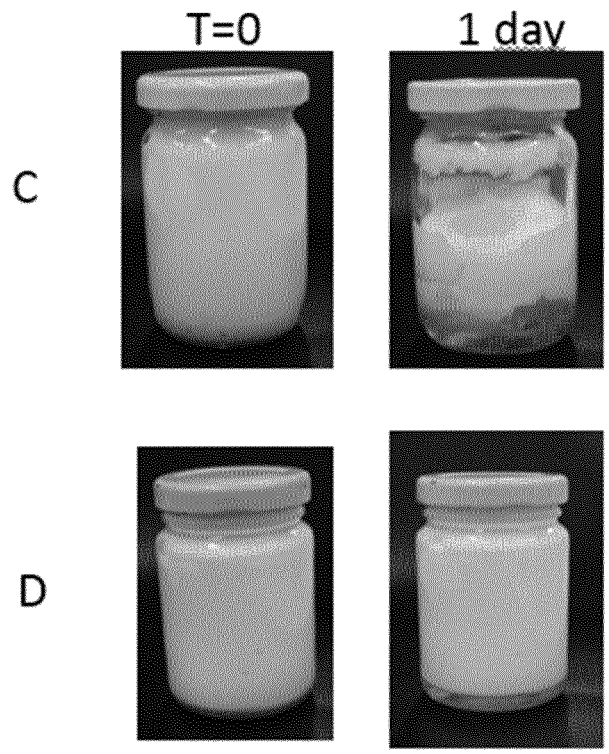
FIG. 38 shows foams generated by pressure release (C) and foams generated by whipping (D) just after formation (T=0) and after 1 day.

The first, most striking difference is the very low stability of the "ΔP foam" (C) in comparison to the "whipped foam" (D). The "ΔP foam" proved very unstable at rest under gravity only, as obvious signs of on-going collapse were observed already over an hour, leading to strong loss of air volume over a day of storage at room temperature (FIG. 38). This contrasts with foams made by whipping, and in order to ensure convincing demonstration of the effect of whipping alone, we subjected the "ΔP foam" to whipping, for different durations spanning from 5 to 40 min. The difference in stability between the foams which underwent whipping or not, was striking both in terms of foam structure and foam stability. FIG. 38 shows that foam stability is strongly improved after only 15 minutes of whipping.

Figure 39:
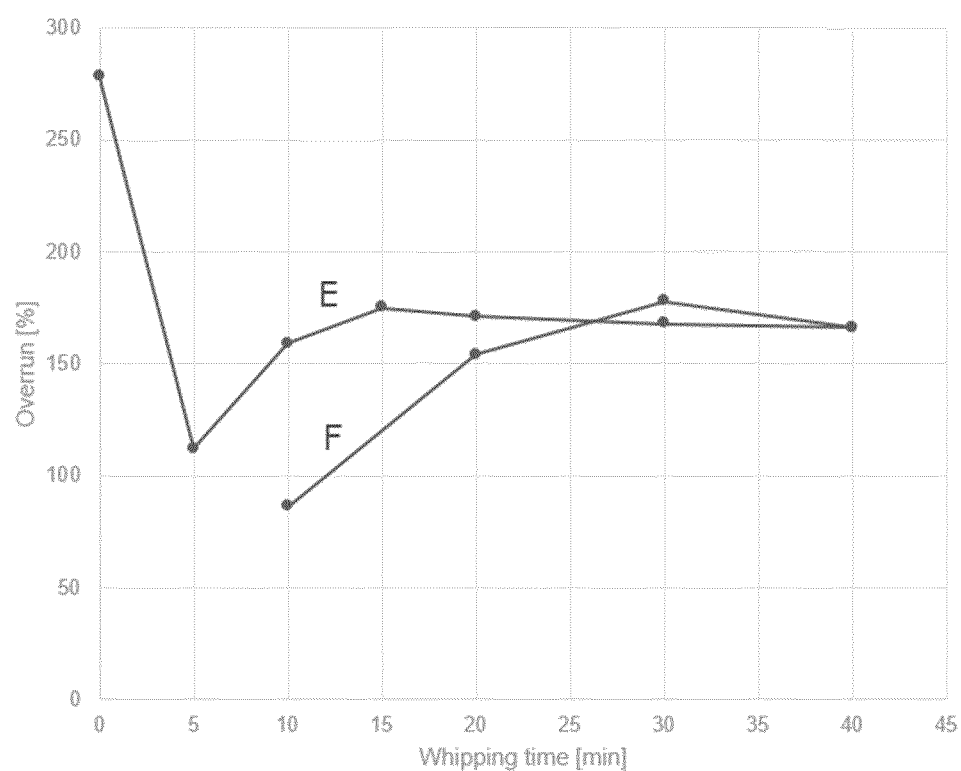
FIG. 39 is a plot of foam overrun against whipping time for a foam initially produced by pressure release (E) before being whipped and a foam which was only whipped mechanically (F).

In FIG. 39, the evolution of the air fraction in a foam initially obtained by depressurization (e74%, i.e. overrun 280%) and subjected to subsequent whipping (E), was measured as function of whipping duration. The overrun of a similar foam which was only subjected to mechanical whipping (F) was also plotted. The bubbles of the initial "ΔP foam" were by a factor 3 to 10 larger, and more polydisperse in size when compared to the foam obtained after subsequent whipping. Not only were the bubbles reduced in size, but also that the important fraction of crystals residing in the bulk was reduced in size and for the most part wrapped around bubbles. After a few minutes of whipping, a large part of the gas entrapped was release to the atmosphere by coalescence events, φ falling to 53% after 5 min of whipping, before rising up again gradually to saturate at a level near 62-63%. After 15 minutes of whipping, φ was near the saturation level, and a very stable foam was produced, not collapsing under gravity. It also means that there is in practice a reduction of whipping time required when inserting a ΔP step prior to whipping. The final level is however practically identical to the aeration level resulting from whipping only, without a depressurization step. This could be interpreted as the effect of whipping in reducing size distributions (both crystals and bubbles) was not significantly influenced by the prior step of depressurization.

Example 21: Biscuit Recipe

A biscuit was prepared using an oil foam to partially replace the fat in the biscuit dough. The reference biscuit was prepared from 140 g melted milk butter, 140 g white, 110 g brown sugar, 1 egg, 1 teaspoon of vanilla extract, 240 g of flour, 6 g of chemical yeast, 6 g of $Na_2CO_3$, 80 g of nuts, 200 g of chocolate (broken into small pieces). All ingredients were mixed together into a dough with the melted butter being added last. The dough was split into 5-10 cm diameter balls and baked for 15 min. at 75° C.

The oil foam biscuit was prepared in a similar manner, but 50% of the butter by volume was replaced by an oil foam. This led to approximately 70 g of butter being replaced by 20 g of the oil foam. The foam was prepared as follows: 10 wt. % of cocoa butter improver (Illexao HS90-AAK), was mixed with HOSFO and warmed until no solid remained. The mixture was placed at 4° C. until it formed a gel (approx. 5 hours) and the gel was then whipped (also at 4° C.) for 1 hour using a kitchen mixer (Hobart, Switzerland) equipped with a balloon whisk. The foam was very stable at 4° C. with no drainage observed. The overrun was between 240-260 vol %, the porosity was therefore between 70 and 72. The oil foam was gently mixed into the other dough ingredients before the melted butter.

Further oil foam biscuits were prepared in the same way but with a cocoa butter equivalent (Coberine®—IOI Loders Croklaan) instead of the cocoa butter improver.

The reference and the oil foam recipes produced acceptable biscuits, with the oil foam biscuits containing less fat by volume and having a firmer texture.

Example 22: Cake Recipe

A sponge cake was prepared using an oil foam to partially replace the fat in the cake batter. The reference cake was prepared from 500 g egg whites, 350 g caster sugar, 350 g flour, the zest and juice of a lemon and 100 g butter. The egg whites were whipped together with the sugar to obtain a firm foam. The flour was then sifted over the egg mixture and gently folded together before adding the lemon. Finally, the melted butter was folded into the mixture to form a cake batter. The batter was placed in a baking tin and baked at 180° C. for 45 minutes. For the oil foam version, an oil foam was prepared as in example 21. 50% of the butter by volume was replaced by the oil foam in the recipe. This led to 50 g of butter being replaced by approximately 29 g of the oil foam. The oil foam was gently mixed into the other cake ingredients before the melted butter.

Further oil foam cakes were prepared in the same way but with a cocoa butter equivalent (Coberine®—IOI Loders Croklaan) instead of the cocoa butter improver.

The reference and the oil foam recipes produced acceptable cakes. In technical tasting the reference cake and the oil foam versions were found to be very similar.

The invention claimed is:

1. A process for forming an aerated fat-based confectionery material, the process comprising the steps of:
   providing a composition having a lipid content greater than 20 wt. %, wherein the composition comprises cocoa solids;
   controlling the temperature of the composition such that the composition comprises glyceride crystals, has a solid lipid content between 0.1 and 80% and forms a gel; and
   aerating the gel,
   wherein the step of aerating the gel comprises mechanical agitation, and
   wherein the aerated fat-based confectionery material comprises a water content less than 5 wt. %.

2. The process according to claim 1, wherein solid particles having a particle size of less than 500 μm are added to the composition.

3. The process according to claim 1, wherein the composition is initially at a temperature at which the composition contains less than 0.1% solid lipid.

4. The process according to claim 1, wherein there is a time interval of at least 5 minutes between the formation of the gel and the start of the aeration.

5. The process according to claim 1, wherein the composition is mixed with un-aerated fat-based confectionery material after the formation of the gel.

6. The process according to claim 1, wherein the lipid content comprises one or more first lipid ingredients and one or more second lipid ingredients, wherein the one or more first lipid ingredients each have a melting point at least 10° C. above that of each of the one or more second lipid ingredients, and the one or more second lipid ingredients are present at a total level greater than 50 wt. % of the lipid content.

7. The process according to claim 1, wherein the temperature of the composition is controlled such that the composition has a solid lipid content between 0.1 and −60%.

8. The process according to claim 1, wherein the temperature of the composition is controlled such that the composition has a solid lipid content between 0.5 and −40%.

9. The process according to claim 1, wherein the temperature of the composition is controlled such that the composition has a solid lipid content between 1 and 20%.

10. The process according to claim 1, wherein the temperature of the composition is controlled such that the composition has a solid lipid content between 5 and 20%.

11. The process according to claim 1, wherein the controlling the temperature of the composition comprises cooling the temperature of the composition between 0° C. and 15° C.

12. The process according to claim 1, wherein the mechanical agitation comprises whipping.

13. The process according to claim 1, wherein the aerated fat-based confectionery material is essentially free from water.

* * * * *